(12) United States Patent
Eki et al.

(10) Patent No.: US 12,701,322 B2
(45) Date of Patent: Aug. 4, 2026

(54) INFORMATION PROCESSING DEVICE, INFORMATION PROCESSING METHOD, AND PROGRAM

(71) Applicant: Sony Semiconductor Solutions Corporation, Atsugi (JP)

(72) Inventors: Ryoji Eki, Kanagawa (JP); Yuki Tsuji, Kanagawa (JP); Shinichi Nagao, Kanagawa (JP)

(73) Assignee: Sony Semiconductor Solutions Corporation, Atsugi (JP)

( * ) Notice: Subject to any disclaimer, the term of this patent is extended or adjusted under 35 U.S.C. 154(b) by 0 days.

(21) Appl. No.: 18/710,379

(22) PCT Filed: Oct. 19, 2022

(86) PCT No.: PCT/JP2022/038978
§ 371 (c)(1),
(2) Date: May 15, 2024

(87) PCT Pub. No.: WO2023/090036
PCT Pub. Date: May 25, 2023

(65) Prior Publication Data
US 2025/0016438 A1 Jan. 9, 2025

(30) Foreign Application Priority Data
Nov. 22, 2021 (JP) ................................. 2021-189366

(51) Int. Cl.
*H04N 23/60* (2023.01)
*G06T 7/00* (2017.01)
(Continued)

(52) U.S. Cl.
CPC ............... *H04N 23/64* (2023.01); *G06T 7/00* (2013.01); *G06T 15/00* (2013.01)

(58) Field of Classification Search
CPC ............. H04N 23/64; H04N 21/21805; H04N 21/23418; H04N 21/251; H04N 23/611;
(Continued)

(56) References Cited

U.S. PATENT DOCUMENTS 10,460,231 B2 * 10/2019 Zhang .................... G06N 3/045
11,030,892 B1 6/2021 Langley
(Continued)

FOREIGN PATENT DOCUMENTS

EP 3783882 A1 2/2021
JP 6638852 B1 1/2020
(Continued)

OTHER PUBLICATIONS

International Search Report and Written Opinion mailed on Jan. 10, 2023, received for PCT Application PCT/JP2022/038978, filed on Oct. 19, 2022, 8 pages including English Translation.

*Primary Examiner* — Ahmed A Berhan
(74) *Attorney, Agent, or Firm* — XSENSUS LLP

(57) ABSTRACT

An information processing device according to the present technology includes: a search processing unit configured to acquire, from an imaging device configured to perform image processing using an artificial intelligence model on a captured image obtained by capturing an image of a subject, result information indicating a result of the image processing, and search for imaging setting information of the imaging device and the artificial intelligence model using artificial intelligence on the basis of the acquired result information; and an application processing unit configured to apply, to the imaging device, the imaging setting information and the artificial intelligence model obtained by means of the search performed by the search processing unit.

18 Claims, 23 Drawing Sheets

(51) Int. Cl.
    *G06T 15/00*       (2011.01)
    *G06V 10/82*       (2022.01)
    *H04N 23/617*     (2023.01)

(58) Field of Classification Search
    CPC ...... H04N 23/617; H04N 23/66; H04N 23/80;
                H04N 21/2223; G06T 7/00; G06T 15/00;
                                G06N 3/08; G06V 10/82
    See application file for complete search history.

(56)                     References Cited

U.S. PATENT DOCUMENTS

| | | | |
|---|---|---|---|
| 11,076,088 B2 * | 7/2021 | Nishimura | G06F 18/217 |
| 11,240,441 B2 * | 2/2022 | Naruse | G06N 20/00 |
| 2021/0092280 A1 | 3/2021 | Nishimura | |

FOREIGN PATENT DOCUMENTS

| | | | |
|---|---|---|---|
| JP | 2020052484 | A | 4/2020 |
| JP | 2021-093568 | A | 6/2021 |
| JP | 2021-515927 | A | 6/2021 |
| WO | 2021/152877 | A1 | 8/2021 |

* cited by examiner 100 (INFORMATION PROCESSING SYSTEM)

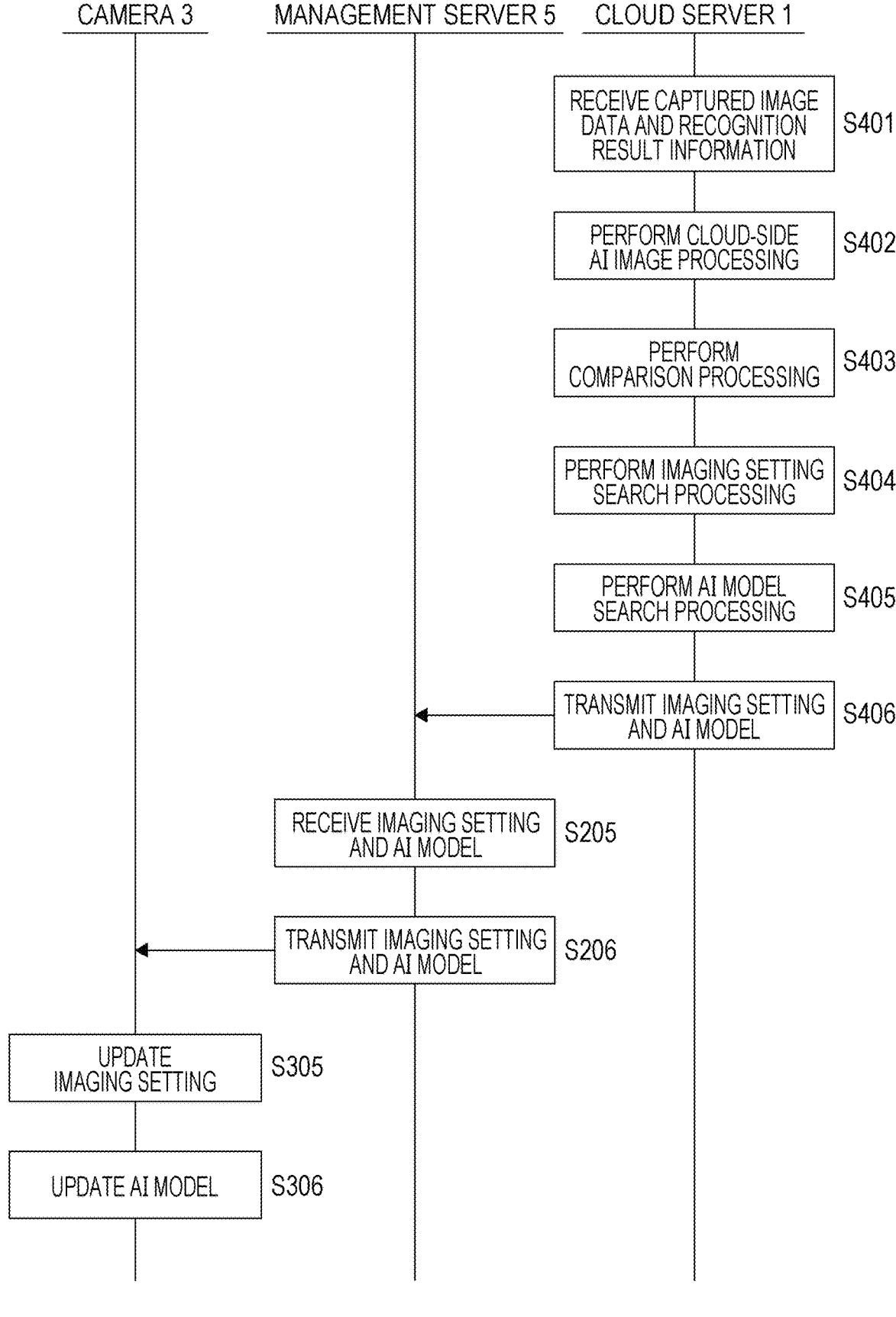

CAMERA 3     MANAGEMENT SERVER 5     CLOUD SERVER 1

| | |
|---|---|
| RECEIVE CAPTURED IMAGE DATA AND RECOGNITION RESULT INFORMATION | S401 |
| PERFORM CLOUD-SIDE AI IMAGE PROCESSING | S402 |
| PERFORM COMPARISON PROCESSING | S403 |
| PERFORM IMAGING SETTING SEARCH PROCESSING | S404 |
| PERFORM AI MODEL SEARCH PROCESSING | S405 |
| TRANSMIT IMAGING SETTING AND AI MODEL | S406 |

| | |
|---|---|
| RECEIVE IMAGING SETTING AND AI MODEL | S205 |
| TRANSMIT IMAGING SETTING AND AI MODEL | S206 |

| | |
|---|---|
| UPDATE IMAGING SETTING | S305 |
| UPDATE AI MODEL | S306 |

USER: XXXXYYY　　Last login: yy ZZ, XXXX

☐ PURCHASE

○ TRAINING DATASET
　☐ TRAINING DATASET A (AAA YEN)
　☐ TRAINING DATASET B (BBB YEN)
　☐ TRAINING DATASET C (CCC YEN)

○ AI MODEL
　☐ AI MODEL A (AA YEN)
　☐ AI MODEL B (BB YEN)
　☐ AI MODEL C (CC YEN)

○ AI APPLICATION
　☐ AI APPLICATION A (AAB YEN)
　☐ AI APPLICATION B (BBC YEN)
　☐ AI APPLICATION C (CCA YEN)

INFORMATION PROCESSING DEVICE, INFORMATION PROCESSING METHOD, AND PROGRAM

CROSS-REFERENCE TO RELATED APPLICATIONS

The present application is based on PCT filing PCT/JP2022/038978, filed Oct. 19, 2022, which claims priority from Japanese Patent Application No. 2021-189366, filed Nov. 22, 2021, the entire contents of each are incorporated herein by reference.

TECHNICAL FIELD

The present technology relates to a technical field of an information processing device, an information processing method, and a program for searching for an artificial intelligence model.

BACKGROUND ART

With the development of the field of machine learning, the machine learning is used to obtain optimum solutions to various problems.

For example, Patent Document 1 discloses a technique in which a recognition processing unit is provided as a machine learning unit that performs recognition processing using a deep neural network (DNN).

CITATION LIST

Patent Document

Patent Document 1: Japanese Patent No. 6638852

SUMMARY OF THE INVENTION

Problems to be Solved by the Invention

In order to enhance the accuracy of image recognition by means of the machine learning, it is important to optimize an imaging setting. That is, even if the artificial intelligence used for machine learning is high in performance, there is a possibility that the accuracy of the image recognition result does not reach an expected level unless the imaging setting is appropriate.

The present technology has been made in view of such a problem, and it is therefore an object of the present technology to improve image recognition accuracy by optimizing an artificial intelligence model used for image recognition processing and an imaging setting for an imaging device that performs, using artificial intelligence, image recognition processing on a captured image obtained by capturing an image of a subject.

Solutions to Problems

An information processing device according to the present technology includes: a search processing unit configured to acquire, from an imaging device configured to perform image processing using an artificial intelligence model on a captured image obtained by capturing an image of a subject, result information indicating a result of the image processing, and search for imaging setting information of the imaging device and the artificial intelligence model using artificial intelligence on the basis of the acquired result information; and an application processing unit configured to apply, to the imaging device, the imaging setting information and the artificial intelligence model obtained by means of the search performed by the search processing unit.

The imaging setting information means, in a broad sense, setting information related to an imaging operation for obtaining a captured image. Specifically, the imaging setting information includes, in a broad sense, optical settings such as a focus and a diaphragm, settings related to an operation of reading a captured image signal such as a frame rate, an exposure time, and a gain, and settings related to image signal processing on the read captured image signal such as gamma correction processing, noise reduction processing, and super-resolution processing.

Furthermore, the artificial intelligence model is an artificial intelligence model used for image processing such as image recognition processing and image detection processing. The search for an artificial intelligence model refers to, for example, processing of optimizing various processing parameters such as a weighting factor in a case where, the image processing includes a convolution operation, setting information (including, for example, information such as a kernel size and the like) regarding a network structure in a case where the image processing is performed using a neural network, and the like.

BRIEF DESCRIPTION OF DRAWINGS

FIG. 8 is a block diagram illustrating an internal configuration example of a camera.

FIG. 14 is a diagram illustrating an example of the flow of processing performed by each device according to the first embodiment.

MODE FOR CARRYING OUT THE INVENTION

Hereinafter, embodiments of an information processing device according to the present technology will be described in the following order with reference to the accompanying drawings.

<1. Information processing system>
<1-1. Overall system configuration>
<1-2. Registration of AI model and AI application>
<1-3. Functional overview of system>
<1-4. Configuration of imaging device>
<1-5. Hardware configuration of information processing device>
<2. Search processing as first embodiment>
<3. Search processing as second embodiment>
<4. Search processing as third embodiment>
<5. Modification>
<6. Screen example of marketplace>
<7. Conclusion>
<8. Present Technology>

1. Information Processing System

<1-1. Overall System Configuration>

Figure 1:
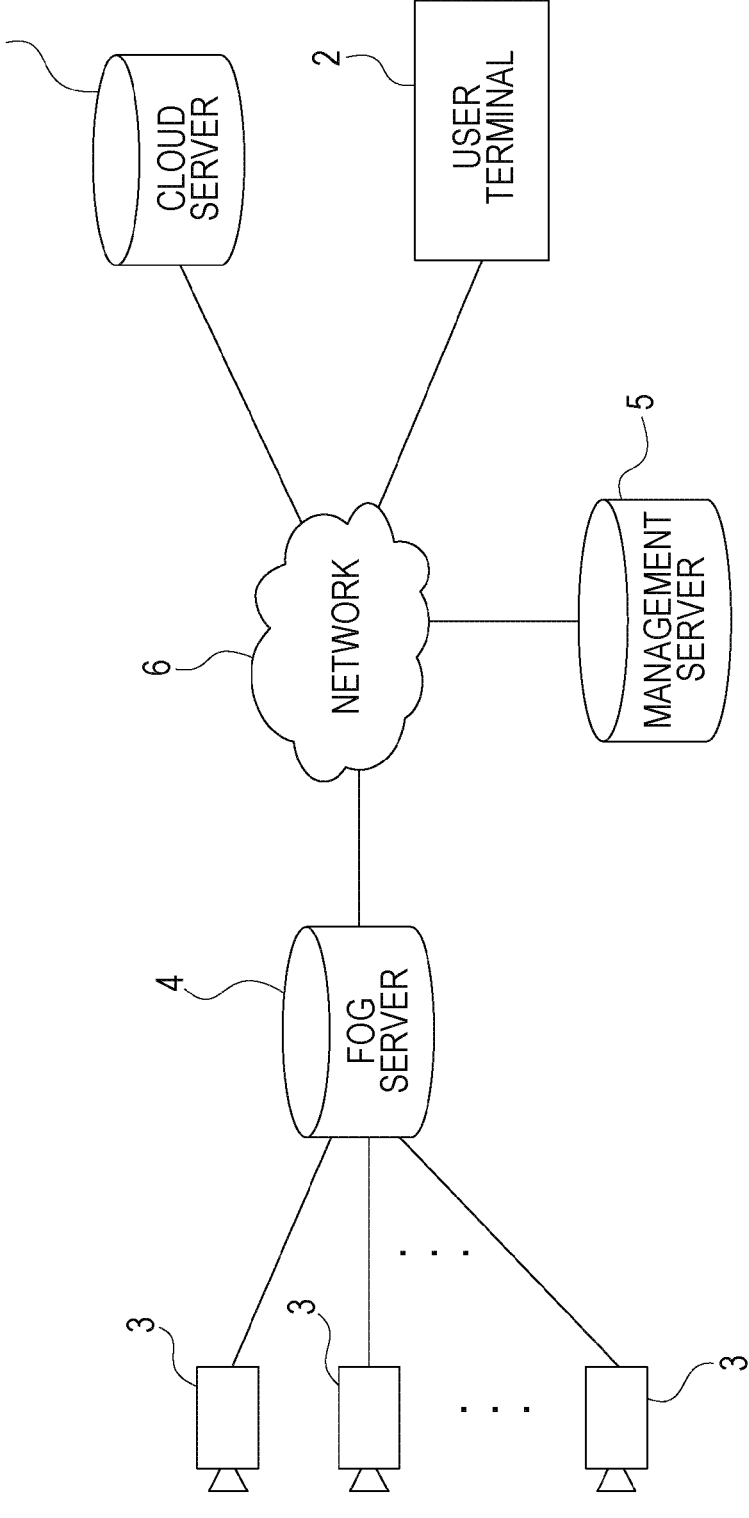
FIG. 1 is a diagram illustrating a configuration example of an information processing system.

FIG. 1 is a block diagram illustrating a schematic configuration example of an information processing system 100 as an embodiment according to the present technology.

As illustrated in the drawing, the information processing system 100 includes at least a cloud server 1, a user terminal 2, a plurality of cameras 3, a fog server 4, and a management server 5. In the present example, at least the cloud server 1, the user terminal 2, the fog server 4, and the management server 5 are capable of communicating with each other over a network 6 such as the Internet.

The cloud server 1, the user terminal 2, the fog server 4, and the management server 5 are each configured as an information processing device that includes a microcomputer including a central processing unit (CPU), a read only memory (ROM), and a random access memory (RAM).

Here, the user terminal 2 is an information processing device designed to be used by a user who is a recipient of a service using the information processing system 100. Furthermore, the management server 5 is an information processing device designed to be used by a service provider.

Each camera 3 includes an image sensor such as a charge coupled device (CCD) type image sensor or a complementary metal oxide semiconductor (CMOS) type image sensor and captures an image of a subject to obtain image data (captured image data) as digital data. Furthermore, as will be described later, each camera 3 further has a function of performing, on the captured image, processing (for example, image recognition processing, image detection processing, or the like) using artificial intelligence (AI). In the following description, various types of processing performed on an image, such as the image recognition processing and the image detection processing, will be simply referred to as "image processing". For example, various types of processing performed on an image using AI (or an AI model) will be referred to as "AI image processing".

Each camera 3 is capable of communicating data with the fog server 4, and is capable of transmitting various data such as processing result information indicating a result of processing (image processing or the like) using AI to the fog server 4 and receiving various data from the fog server 4, for example.

Here, the information processing system 100 illustrated in FIG. 1 is designed to cause the fog server 4 or the cloud server 1 to generate information regarding analysis of the subject on the basis of, for example, the processing result information obtained as a result of the AI image processing performed by each camera 3 and allow the user to view the generated analysis information using the user terminal 2.

In this case, the possible use of each camera 3 includes the uses as various types of surveillance cameras. The examples of the use include the uses as: a surveillance camera for monitoring indoors such as a store, an office, or a house, a surveillance camera (including a traffic surveillance camera and the like) for monitoring outdoor such as a parking lot or a street, a surveillance camera for a production line of factory automation (FA) or industrial automation (IA), and a surveillance camera for monitoring the inside or outside of a vehicle.

For example, in a case where the camera 3 is used as a surveillance camera for a store, it is conceivable to arrange a plurality of cameras 3 at predetermined positions in the store so as to allow the user to check customer demographics (gender, age group, etc.), customer actions (flow line) within the store, and the like. In this case, it is conceivable to generate, as the above-described analysis information, information regarding the customer demographics, information regarding the flow line in the store, information regarding a congestion status at a checkout (for example, a waiting time at the checkout), and the like.

Alternatively, in a case where the camera 3 is used as a traffic surveillance camera, it is conceivable to arrange each camera 3 at a position near a road so as to allow the user to recognize information such as a license number (vehicle number), a vehicle color, a vehicle type, and the like regarding a passing vehicle, and in this case, it is conceivable to generate, as the above-described analysis information, information such as the license number, the vehicle color, the vehicle type, and the like.

Furthermore, in a case where the camera 3 is used as a traffic surveillance camera in a parking lot, it is conceivable to arrange the camera so as to be able to monitor each parked vehicle, monitor whether or not there is a suspicious person acting suspiciously around each vehicle, and in a case where there is a suspicious person, to make a notification of a fact that there is a suspicious person, an attribute (gender or age group) of the suspicious person, and the like.

Moreover, it is also conceivable to monitor a street or an available space in the parking lot and notify the user of a place of the available parking space.

In a case where the camera 3 is used as a surveillance camera for a store as described above, the fog server 4 is designed to be arranged in a store being monitored together with each camera 3, that is, arranged for each object being monitored, for example. Providing the fog server 4 for each monitoring target such as a store as described above eliminates the need for the cloud server 1 to directly receive transmission data from the plurality of cameras 3 installed in the monitoring target, which allows a reduction in processing load on the cloud server 1.

Note that, in a case where there is a plurality of stores being monitored and all the stores belong to the same corporate group, one fog server 4 may be provided for the plurality of stores rather than being provided for each store. That is, the present technology is not limited to the configuration where one fog server 4 is provided for each object being monitored, and one fog server 4 can be provided for a plurality of objects being monitored.

Note that, in a case where the cloud device 1 or each camera 3 can have the function of the fog server 4 due to large processing capacity of the cloud server 1 or each camera 3, the fog server 4 may be removed from the information processing system 100, each camera 3 may be directly connected to the network 6, and the cloud server 1 may directly receive transmission data from the plurality of cameras 3.

<1-2. Registration of AI Model and AI Application>

As described above, in the information processing system 100, the camera 3 serving as the edge-side information processing device performs the AI image processing, and an advanced application function using the result information of the AI image processing performed on the edge side (for example, the result information of the image recognition processing using AI) is implemented by the cloud server 1 serving as the cloud-side information processing device.

Here, there are various possible methods for registering an application function in the cloud server 1 (or including the fog server 4) serving as the cloud-side information processing device.

One example of the methods will be described with reference to FIG. 2.

Figure 2:
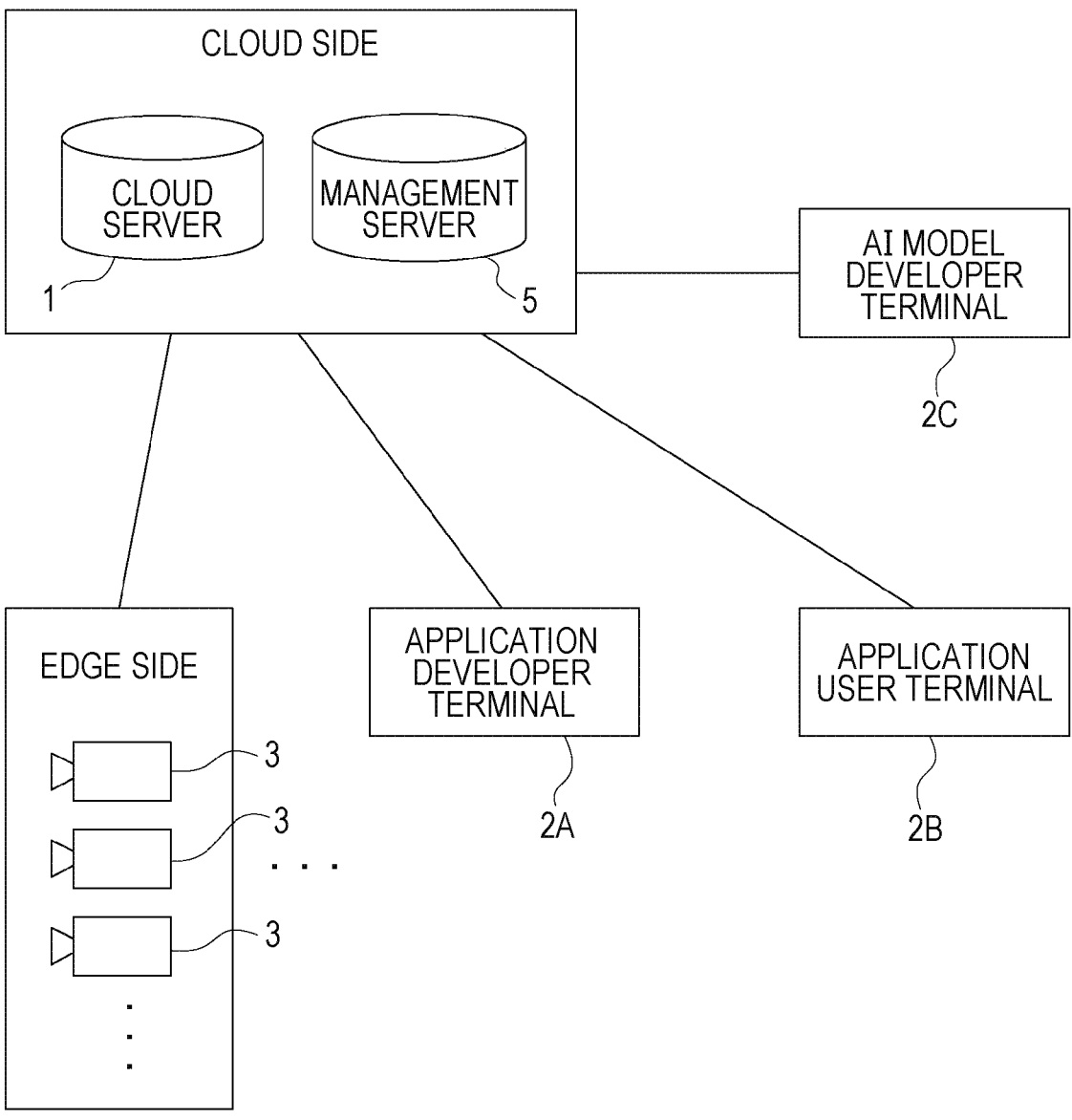
FIG. 2 is a diagram for describing each device that registers and downloads an AI model or an AI application via a marketplace function provided in a cloud-side information processing device.

Note that although the fog server 4 is not illustrated in FIG. 2, the fog server 4 may be provided. In this case, the fog server 4 may be responsible for part of the cloud-side functionality or part of the edge-side functionality.

The above-described cloud server 1 and management server 5 are information processing devices that configure a cloud-side environment.

Furthermore, the camera 3 is an information processing device that configures an edge-side environment.

Furthermore, examples of the user terminal 2 used by a user who uses various services provided by the cloud-side information processing device include an application developer terminal 2A that is used by a user who develops an application to be used for AI image processing, an application user terminal 2B that is used by a user who uses an application, and an AI model developer terminal 2C that is used by a user who develops an AI model to be used for AI image processing.

Note that a user who develops an application that does not use AI image processing may use the application developer terminal 2A.

In the cloud-side information processing device, a training dataset used for AI training is prepared. The user who develops the AI model uses the AI model developer terminal 2C to communicate with the cloud-side information processing device and download the training dataset. At this time, the training dataset may be provided for a fee. For example, an AI model developer may purchase a training dataset in a state where various functions and materials registered in a marketplace (electronic market) prepared as a cloud-side function are available for purchase by registering personal information in the marketplace.

The AI model developer develops the AI model using the training dataset, and then registers the developed AI model in the marketplace using the AI model developer terminal 2C. Accordingly, an incentive may be paid to the AI model developer when the AI model is downloaded.

Furthermore, the user who develops an application downloads the AI model from the marketplace using the application developer terminal 2A and develops an application (hereinafter simply referred to as "AI application") using the AI model. At this time, as described above, an incentive may be paid to the AI model developer.

The application development user registers the developed AI application in the marketplace using the application developer terminal 2A. Accordingly, when the AI application is downloaded, an incentive may be paid to the user who has developed the AI application.

The user who uses the AI application performs an operation of loading (deploying) an AI application and an AI model from the marketplace to the camera 3 serving as the edge-side information processing device managed by the user with the application user terminal 2B. At this time, an incentive may be paid to the AI model developer.

It is therefore possible for the camera 3 to perform the AI image processing using the AI application and the AI model, and it is possible not only to capture an image but also to detect a customer or detect a vehicle by means of the AI image processing.

Furthermore, the camera 3 may be capable of extracting, by means of the AI image processing, attribute information of a customer from a captured image captured by the camera 3.

Such attribute information is transmitted from the camera 3 to the cloud-side information processing device over the network 6.

A cloud application has already been loaded in the cloud-side information processing device, so that each user can use the cloud application over the network 6. Then, in the cloud application, an application for analyzing a customer flow line using attribute information or a captured image of a customer and the like are prepared. Such a cloud application is uploaded by the application development user or the like.

The use of the cloud application for analyzing a flow line using the application user terminal 2B allows the application user to analyze a customer flow line in his/her own store and view the analysis result. The analysis result is viewed by means of, for example, a graphical presentation of the customer flow line on a map of the store.

Furthermore, the result of the flow line analysis may be displayed in the form of a heat map, and the analysis result may be viewed by means of a presentation of the density of customers or the like.

Furthermore, such information may be displayed separately for information regarding each attribute of customers.

An AI model optimized for each user may be registered in a cloud-side marketplace. For example, a captured image captured by the camera 3 arranged in a store managed by a certain user is uploaded to and accumulated in the cloud-side information processing device as needed.

A server-side information processing device performs processing of retraining an AI model to update the AI model each time a certain number of uploaded captured images are accumulated, and re-registering the AI model in the marketplace.

Note that the processing of relearning an AI model may be optionally selected by the user on the marketplace, for example.

For example, an AI model retrained using dim images from the camera 3 arranged in the store is loaded into the camera 3, so as to allow an increase in recognition rate of image processing performed on images captured in a dim place or the like. Furthermore, an AI model retrained using bright images from the camera 3 arranged outside the store is loaded into the camera 3, so as to allow an increase in recognition rate of image processing performed on images captured in a bright place or the like.

That is, the application user can normally obtain optimized processing result information by reloading the updated AI model into the camera 3.

Note that the processing of retraining an AI model will be described again.

Furthermore, in a case where personal information is included in information (captured image or the like) uploaded from the camera 3 to the server-side information processing device, data from which information regarding privacy has been deleted may be uploaded from the viewpoint of privacy protection, or the data from which the information regarding privacy has been deleted may be made available to the AI model development user or the application development user.

Figure 3:
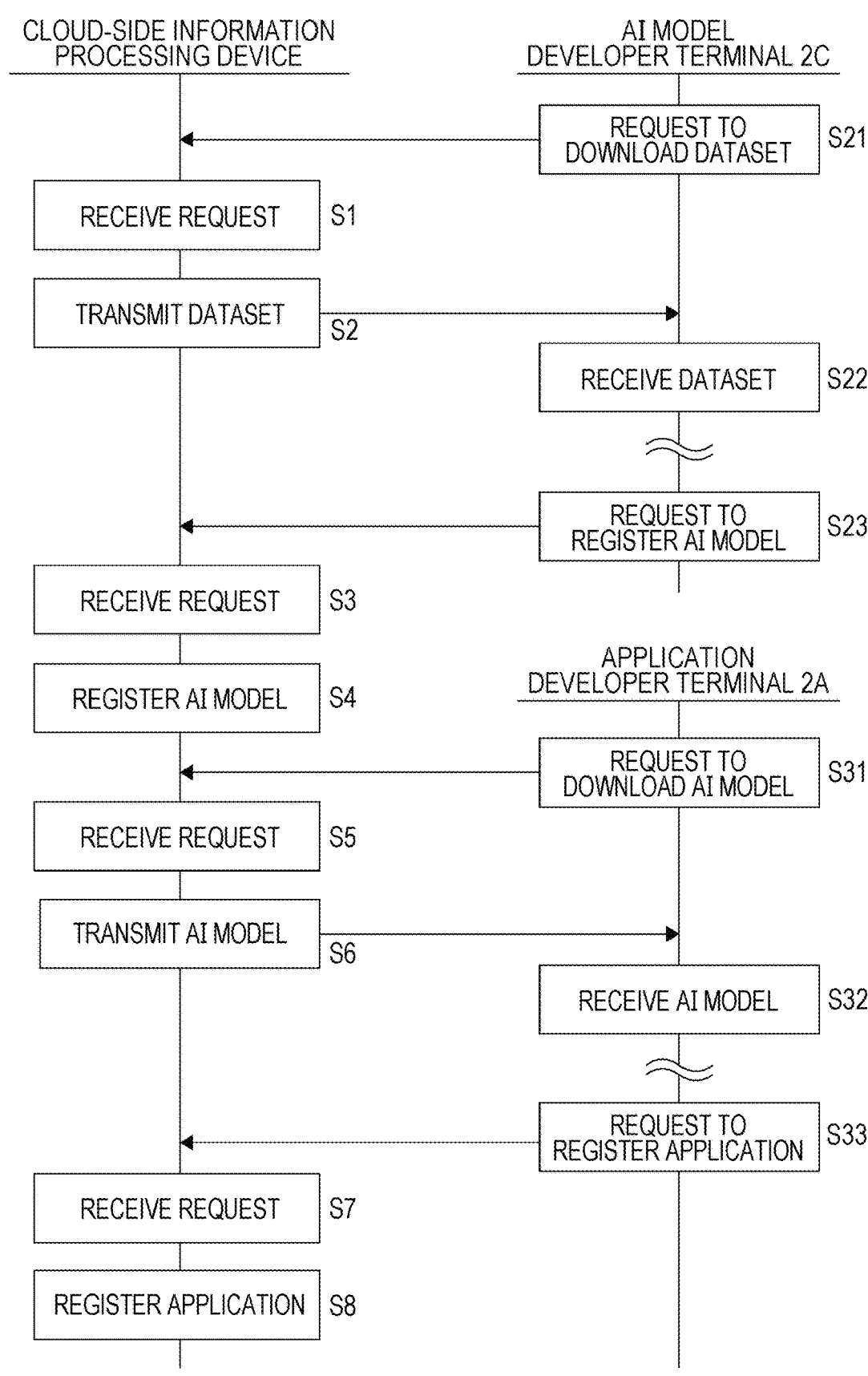
FIG. 3 is a diagram illustrating, together with FIG. 4, an example of a flow of processing performed by each device when the AI model or the AI application is registered or downloaded via the marketplace function.
Figure 4:
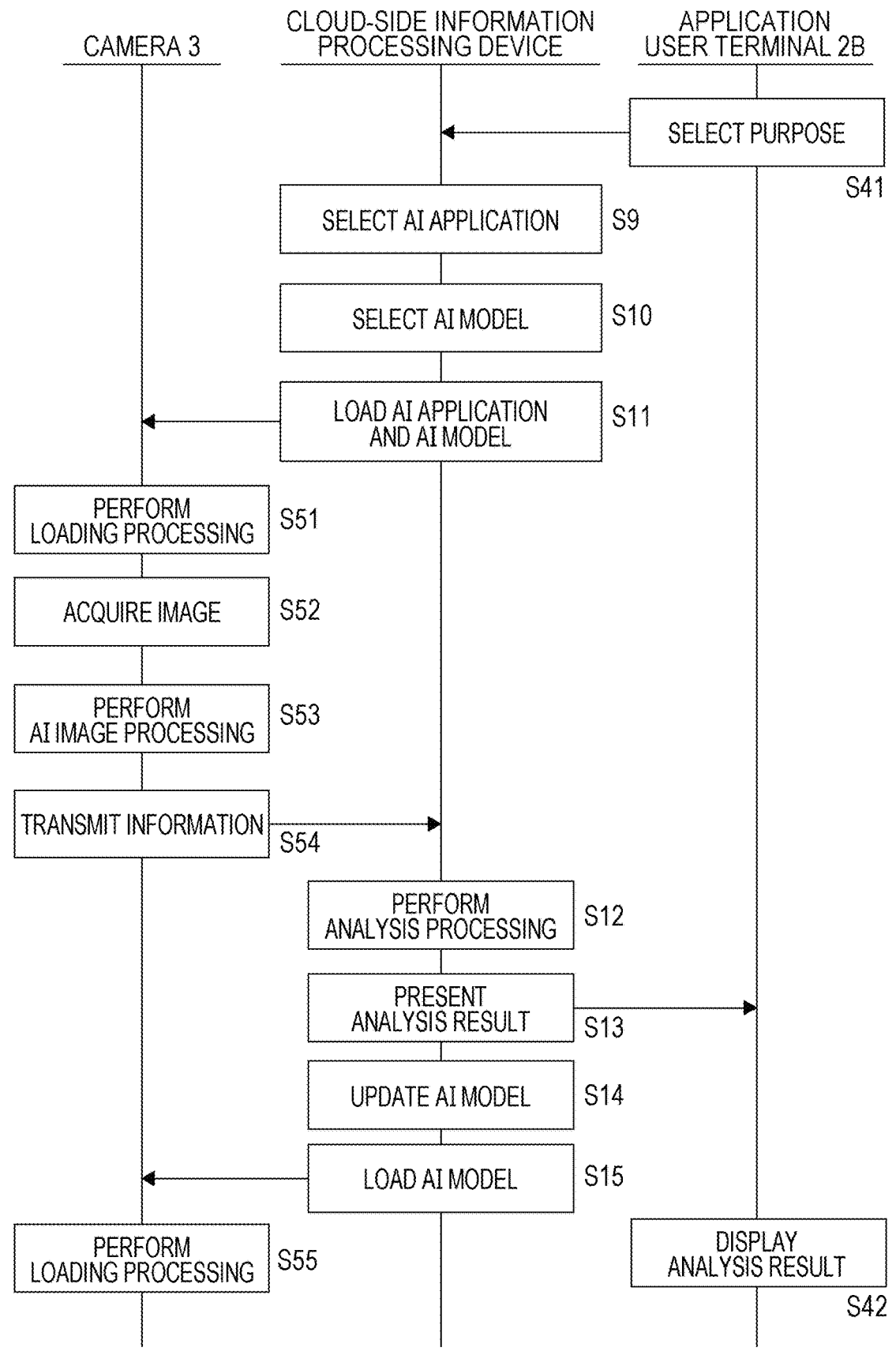
FIG. 4 is a diagram illustrating, together with FIG. 3, an example of the flow of processing performed by each device when the AI model or the AI application is registered or downloaded via the marketplace function.

FIGS. 3 and 4 illustrates a flow of the above-described processing.

Note that the cloud-side information processing device corresponds to the cloud server 1, the management server 5, and the like in FIG. 1.

When the AI model developer views a list of datasets registered in the marketplace and selecting a desired dataset using the AI model developer terminal 2C having a display unit including a liquid crystal display (LCD), an organic electro luminescence (EL) panel, or the like, the AI model developer terminal 2C transmits, to the cloud-side information processing device, a request to download the selected dataset in step S21.

Accordingly, the cloud-side information processing device receives the request in step S1, and performs processing of transmitting the requested dataset to the AI model developer terminal 2C in step S2.

The AI model developer terminal 2C performs processing of receiving the dataset in step S22. This allows the AI model developer to develop the AI model using the dataset.

After the end of the development of the AI model, when the AI model developer performs an operation of registering the developed AI model in the marketplace (for example, designating a name of the AI model, an address at which the AI model is placed, and the like), the AI model developer terminal 2C transmits a request to register the AI model in the marketplace to the cloud-side information processing device in step S23.

Accordingly, the cloud-side information processing device receives the registration request in step S3 and performs the processing of registering the AI model in step S4, so as to be able to display the AI model on the marketplace, for example. It is therefore possible for a user other than the AI model developer to download the AI model from the marketplace.

For example, an application developer who intends to develop an AI application views a list of AI models registered in the marketplace with the application developer terminal 2A. In response to the operation (for example, an operation of selecting one of the AI models on the marketplace) performed by the application developer, the application developer terminal 2A transmits, to the cloud-side information processing device, a request to download the selected AI model in step S31.

The cloud-side information processing device receives the request in step S5 and transmits the AI model to the application developer terminal 2A in step S6.

The application developer terminal 2A receives the AI model in step S32. It is therefore possible for the application developer to develop an AI application using the AI model developed by another person.

After the end of the development of the AI application, when the application developer performs an operation of registering the AI application in the marketplace (for example, an operation of designating a name of the AI application, an address at which the AI model is placed, and the like), the application developer terminal 2A transmits, to the cloud-side information processing device, a request to register the AI application in step S33.

The cloud-side information processing device receives the registration request in step S7 and registers the AI application in step S8, so as to be able to display the AI application on the marketplace, for example. It is therefore possible for a user other than the application developer to select and download the AI application on the marketplace.

For example, as illustrated in FIG. 4, the user who intends to use the AI application causes the application user terminal 2B to perform purpose selection in step S41. In the purpose selection, a selected purpose is transmitted to the cloud-side information processing device.

Accordingly, the cloud-side information processing device selects an AI application according to the purpose in step S9, and selects an AI model in step S10. For example, table data in which the AI application and the AI model according to the purpose are associated with each other is stored in the cloud-side information processing device, which makes the AI application and the AI model according to the purpose selectable.

The cloud-side information processing device performs processing of loading the selected AI application and AI model in step S11. In this loading processing, the AI application and the AI model are transmitted to the camera 3.

Accordingly, the camera 3 performs processing of loading the AI application and the AI model in step S51. It is therefore possible to perform the AI image processing on the captured image captured by the camera 3.

The camera 3 acquires an image by performing an imaging operation in step S52. Then, the camera 3 performs the AI image processing on the acquired image to obtain, for example, an image recognition result in step S53.

The camera 3 performs processing of transmitting the captured image and the result information of the AI image processing in step S54. In the information transmission in step S54, both or either of the captured image and the result information of the AI image processing may be transmitted.

Upon receipt of such information, the cloud-side information processing device performs analysis processing in step S12. In this analysis processing, for example, processing of analyzing a customer flow line or analyzing a vehicle for traffic monitoring is performed.

The cloud-side information processing device performs processing of presenting an analysis result in step S13. This processing is realized, for example, by the user using the cloud application described above.

In response to the processing of presenting the analysis result, the application user terminal 2B performs processing of displaying the analysis result on a monitor or the like in step S42.

The processing performed so far allows the user who is an AI application user to obtain the analysis result according to the purpose selected in step S41.

Note that the AI model may be updated so as to be optimized for the image captured by the camera 3 managed by the application user.

For example, when the camera 3 repeatedly performs each processing of steps S52, S53, and S54, the captured image received from the camera 3 and the result information of the AI image processing are accumulated in the cloud-side information processing device.

Then, in a case where a certain amount of information is accumulated, the cloud-side information processing device performs processing of updating an AI model in step S14. This processing corresponds to processing of retraining an AI model by giving new data to the AI model.

The cloud-side information processing device performs processing of loading the updated new AI model in step S15.

In response to this loading processing, the camera 3 performs processing of loading the new AI model in step S55.

Note that, in a case where an AI application is also updated, the updated AI application may be further loaded in the processing of step S55.

<1-3. Functional Overview of System>

In the present embodiment, as a service in which the information processing system 100 is used to be a service in which the user who is a customer can select a type of function for the AI image processing of each camera 3 is assumed. In the selection of the type of function, for example, an image recognition function, an image detection function, or the like may be selected, or a more detailed type of function may be selected to exhibit an image recognition function, an image detection function, or the like for a specific subject.

For example, as a business model, a service provider sells the camera 3 and the fog server 4 that has an image recognition function by AI to the user and causes the camera 3 and the fog server 4 to be installed at a location to be monitored. Then, the service provider makes a service that provides the user with analysis information as described above available.

At this time, a use required for the system, such as a store monitoring use or a traffic monitoring use, differs for each customer, so that the AI image processing function of the camera 3 is made selectively configurable so as to obtain analysis information corresponding to the use required by the customer.

In the present example, the management server 5 has a function of selectively configure such an AI image processing function of the camera 3.

Note that the cloud server 1 or the fog server 4 may have the function of the management server 5.

Here, connection between the cloud server 1 and the management server 5 each serving as the cloud-side information processing device and the camera 3 serving as the edge-side information processing device will be described with reference to FIG. 5.

A retraining function, a device management function, and a marketplace function that are functions available via a Hub are implemented in the cloud-side information processing device.

The Hub performs secure and highly reliable communication with the edge-side information processing device. Accordingly, various functions can be provided to the edge-side information processing device.

The retraining function is a function of providing a newly optimized AI model by performing retraining, and accordingly, a suitable AI model based on a new training material is provided.

The device management function is a function of managing the camera 3 and the like serving as the edge-side information processing device, and can provide, for example, functions such as a function of managing and monitoring the AI model loaded in the camera 3, and function of detecting and troubleshooting a problem.

Moreover, the device management function protects secure access made by an authenticated user.

The marketplace function provides a function of registering the AI model developed by the AI model developer or the AI application developed by the application developer as described above, a function of loading such developments into an authorized edge-side information processing device, and the like.

Furthermore, the marketplace function also provides a function related to payment of an incentive in response to the loading of the developed product.

The camera 3 serving as the edge-side information processing device includes an edge runtime, an AI application and an AI model, and an image sensor IS.

The edge runtime functions as embedded software or the like for managing an application loaded into the camera 3 or communicating with the cloud-side information processing device.

As described above, the AI model is obtained by loading an AI model registered in the marketplace in the cloud-side information processing device, so that the camera 3 can obtain the result information of the AI image processing according to the purpose using the captured image.

An overview of the function of the management server 5 will be described with reference to FIG. 6.

As illustrated in the drawing, the management server 5 has an application configuration function F1 and a processing allocation search function.

The application configuration function F1 is a function of configuring an application of the information processing system 100. Herein, the application refers to the AI application described above, and is selected in accordance with a use such as a store monitoring use or a traffic monitoring use. The application configuration function F1 is a function of configuring a function of the information processing system 100 so as to obtain analysis information corresponding to the use desired by the customer.

Specifically, as the processing of the application configuration function F1, the management server 5 performs processing of receiving selection of an AI application from the user terminal 2 (corresponding to the application user terminal 2B in FIG. 2), processing of configuring AI for each camera 3 so as to obtain an AI image processing function corresponding to the selected AI application, and selection setting processing of selecting and setting processing details of analysis processing so as to obtain analysis information corresponding to the selected AI application as analysis information generated on the basis of the result of the AI image processing of the camera 3. The selection setting processing for the analysis processing is performed on the cloud server 1 when the analysis processing is performed by the cloud server 1, and is performed on the fog server 4 when the analysis processing is performed by the fog server 4.

Note that examples of the analysis processing include processing of analyzing a flow line, processing of analyzing a traffic volume, and the like. For example, in the processing of analyzing a flow line, recognition result information is obtained by performing image recognition processing of detecting a person for each captured image captured by the camera 3. Then, an imaging time of each captured image and a pixel region where the person to be detected is detected are specified on the basis of the recognition result information, and the movement of the person in the store is finally grasped to analyze the flow line of the target person. In a case where not only the movement of the specific person but also the movement of store visitors is grasped as a whole, it is possible to analyze, by performing such processing on each store visitor and finally performing statistical processing, a general flow line of the store visitors or the like.

The processing allocation search function F2 means a function of performing a search using AI in order to optimize processing allocation such as which part of processing is performed by which device for a series of processing up to presentation of analysis information to the user. Note that details of the processing allocation search function F2 will be described later again.

Figure 7:
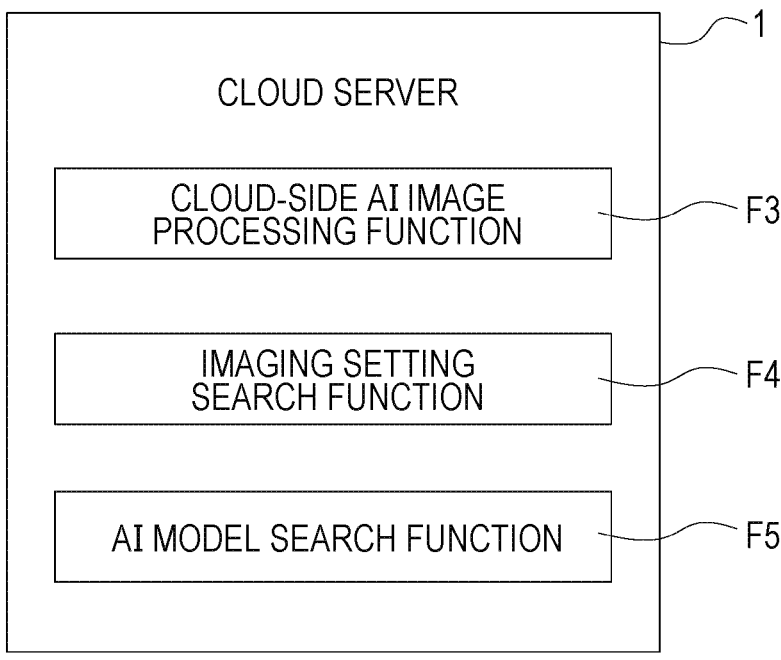
FIG. 7 is a functional block diagram of a cloud server.

FIG. 7 is a diagram for describing an overview of the function of the cloud server 1.

As illustrated in the drawing, the cloud server 1 has a cloud-side AI image processing function F3, an imaging setting search function F4, and an AI model search function F5.

The cloud-side AI image processing function F3 is a function of performing AI image processing on the captured image transmitted from each camera 3. The AI image processing performed by the cloud server 1 will be referred to as "cloud-side AI image processing". Then, an AI model used for the cloud-side AI image processing will be referred to as "cloud-side AI model".

As the cloud-side AI image processing, for example, image recognition processing of recognizing a target subject is performed. Herein, the target refers to an object that can be a detection target from an image. What kind of object becomes the target differs in a manner that depends on the use of the information processing system 100 or the like, but there is a possibility that any object becomes the target. Any objects may be applicable, and some examples will be given as follows: an animal including a person; a moving object (an automobile, a bicycle, an aircraft, and the like); a plant (vegetable, fruit, tree, and the like); an industrial product or part; a building; a facility; a mountain; a sea; a river; a star; the sun; a cloud; and the like.

The AI used for the cloud-side AI image processing is different from the AI used for the AI image processing in the camera 3.

Note that, in the following description, image recognition processing using AI will be described as an example of the AI image processing, but the present embodiment is not limited to such processing, and AI image processing of a different function type such as image detection processing may be used as described later.

The imaging setting search function F4 is a function of acquiring result information (hereinafter, referred to as "recognition result information") of image recognition indicating the result of AI image processing from the camera 3, and searching for imaging setting information of the camera 3 using AI on the basis of the acquired recognition result information. Here, the imaging setting information (hereinafter, simply referred to as "imaging setting") means, in a broad sense, setting information related to an imaging operation for obtaining a captured image. Specifically, the imaging setting information includes, in a broad sense, optical settings such as a focus and a diaphragm, settings related to an operation of reading a captured image signal such as a frame rate, an exposure time, and a gain, and settings related to image signal processing on the read captured image signal such as gamma correction processing, noise reduction processing, and super-resolution processing.

The AI model search function F5 is a function of acquiring recognition result information indicating the result of AI image processing from the camera 3 and searching for an optimum AI model used for image recognition processing in the camera 3 using another AI on the basis of the acquired recognition result information. Here, the AI model used for image recognition processing in the camera 3 will be referred to as "edge-side AI model".

Here, the search for an AI model corresponds to a search for the edge-side AI model, and corresponds to processing in which, for example, the image recognition processing optimizes various processing parameters such as a weighting factor, setting information (including, for example, information such as a kernel size and the like) regarding a network structure, and the like for a convolutional neural network (CNN) or the like including a convolution operation.

Since the cloud server 1 has the imaging setting search function F4 and the AI model search function F5, that is, the function of searching for the imaging setting information and the edge-side AI model of the camera 3 using AI, imaging settings are performed on the AI image processing subjected to the function settings by means of the above-described application configuration function F1 so as to make the image recognition result satisfactory, and AI image processing is performed using an edge-side AI model according to the actual use environment.

Note that details of the imaging setting search function F4 and the AI model search function F5 will be described later.

<1-4. Configuration of Imaging Device>

Figure 8:
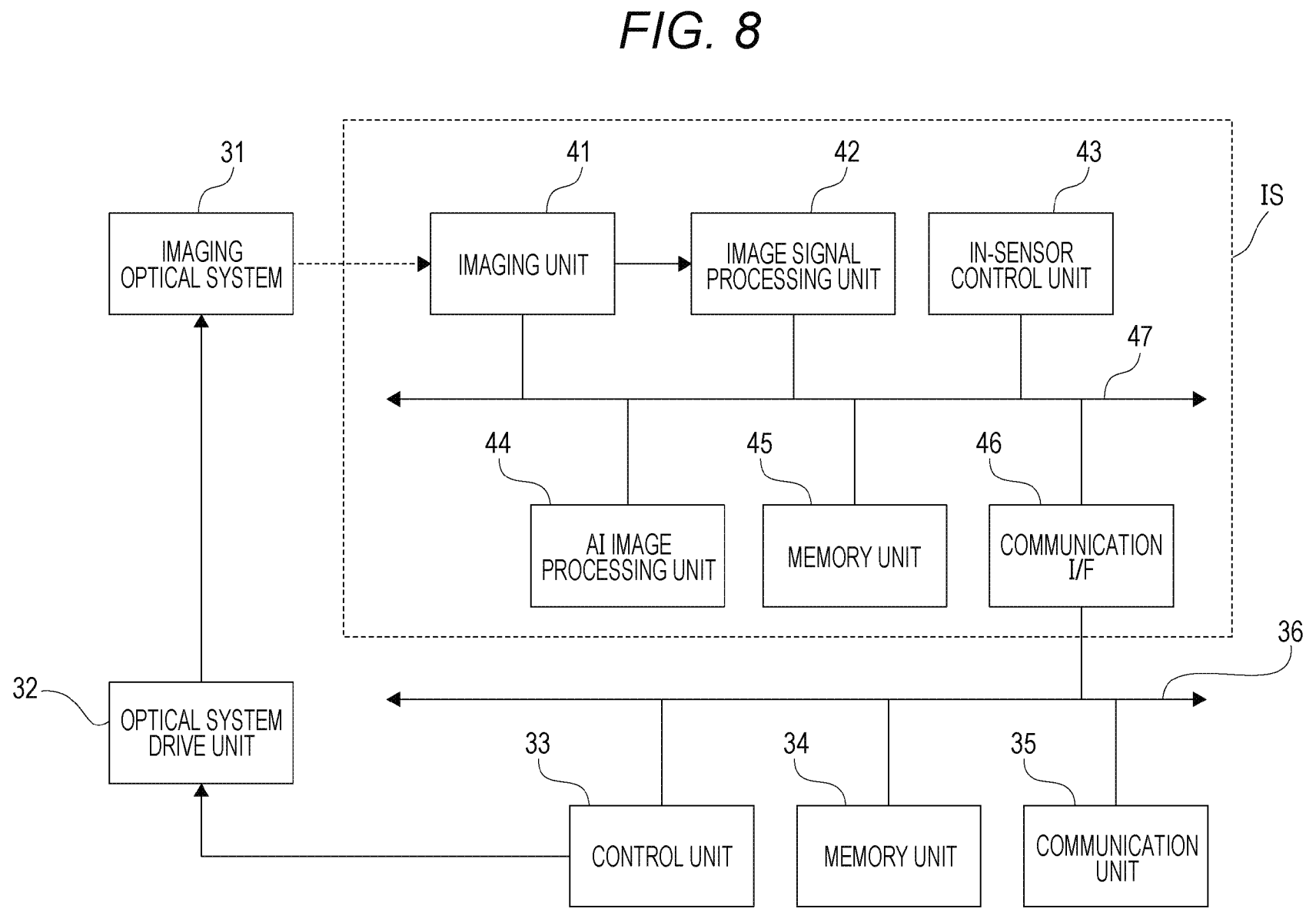

FIG. 8 is a block diagram illustrating an internal configuration example of the camera 3.

As illustrated in the drawing, the camera 3 includes an imaging optical system 31, an optical system drive unit 32, the image sensor IS, a control unit 33, a memory unit 34, and a communication unit 35. The image sensor IS, the control unit 33, the memory unit 34, and the communication unit 35 are connected to each other over a bus 36 so as to communicate data with each other.

The imaging optical system 31 includes lenses such as a cover lens, a zoom lens, and a focus lens, and a diaphragm (iris) mechanism. Light (incident light) from a subject is guided by the imaging optical system 31, and the light is condensed on a light receiving surface of the image sensor IS.

The optical system drive unit 32 comprehensively represents drive units of the zoom lens, the focus lens, and the diaphragm mechanism included in the imaging optical system 31. Specifically, the optical system drive unit 32 includes an actuator for driving each of the zoom lens, the focus lens, and the diaphragm mechanism, and a drive circuit of the actuator.

The control unit 33 includes, for example, a microcomputer including a CPU, a ROM, and a RAM, and performs the overall control of the camera 3 by causing the CPU to perform various types of processing in accordance with a program stored in the ROM or a program loaded in the RAM.

Furthermore, the control unit 33 instructs the optical system drive unit 32 to drive the zoom lens, the focus lens, the diaphragm mechanism, and the like. The optical system drive unit 32 moves the focus lens and the zoom lens, opens or closes a diaphragm blade of the diaphragm mechanism, or the like in response to such a drive instruction.

Furthermore, the control unit 33 controls the writing and reading of various types of data to and from the memory unit 34.

The memory unit 34 is a non-volatile storage device such as a hard disk drive (HDD) or a flash memory device, and is used as a storage destination (recording destination) of image data output from the image sensor IS.

Moreover, the control unit 33 communicates various data with an external device via the communication unit 35. The communication unit 35 in the present example is capable of communicating data with at least the fog server 4 (or the cloud server 1) illustrated in FIG. 1. The image sensor IS is configured as, for example, a CCD or CMOS image sensor.

The image sensor IS includes an imaging unit 41, an image signal processing unit 42, an in-sensor control unit 43, an AI image processing unit 44, a memory unit 45, and a communication I/F 46, and such components can communicate data with each other over a bus 47.

The imaging unit 41 includes a pixel array unit in which pixels each having a photoelectric conversion element such as a photodiode are two-dimensionally arranged, and a readout circuit that reads out an electric signal obtained by photoelectric conversion from each pixel included in the pixel array unit, and can output the electric signal as a captured image signal.

This readout circuit performs, for example, correlated double sampling (CDS) processing, automatic gain control (AGC) processing, and the like on the electric signal obtained by photoelectric conversion, and further performs analog/digital (A/D) conversion processing on the electric signal.

The image signal processing unit 42 performs preprocessing, synchronization processing, YC generation processing, resolution conversion processing, codec processing, and the like on a captured image signal as digital data obtained as a result of the A/D conversion processing.

In the preprocessing, clamp processing of clamping the black level of R, G, and B to a predetermined level, correction processing among R, G, B color channels and the like are performed on the captured image signal. In the synchronization processing, color separation processing is performed so as to cause image data for each pixel to have all the R, G, and B color components. For example, in a case of an imaging element using a Bayer color filter, demosaicing processing is performed as the color separation processing. In the YC generation processing, a luminance (Y) signal and a color (C) signal are generated (separated) from the image data of R, G, and B. In the resolution conversion processing, resolution conversion processing is performed on the image data subjected to various types of signal processing.

In the codec processing, for example, encoding processing for recording or communication and file generation are performed on the image data subjected to the various types of processing described above. In the codec processing, it is possible to generate a file in a format such as moving picture experts group (MPEG)-2 or H.264 as a moving image file format. It is also conceivable to generate a file in a format such as joint photographic experts group (JPEG), tagged image file format (TIFF), or graphics interchange format (GIF) as a still image file.

The in-sensor control unit 43 gives an instruction to the imaging unit 41 to perform execution control of the imaging operation. Similarly, processing execution control is also performed on the image signal processing unit 42.

The AI image processing unit 44 performs image recognition processing as the AI image processing on the captured image. The AI image processing performed in the camera 3 will be referred to as "edge-side AI image processing".

As the edge-side AI image processing, processing of recognizing a target subject is performed. There are various possible targets for the edge-side AI image processing in a manner similar to the target for the cloud-side AI image processing.

The edge-side image recognition function using AI can be realized using a programmable arithmetic processing device such as a CPU, a field programmable gate array (FPGA), or a digital signal processor (DSP).

It is possible to switch the edge-side image recognition function that can be realized by the AI image processing unit 44 by changing an algorithm of the edge-side AI image processing. In other words, it is possible to switch a function type of the AI image processing by switching the edge-side AI model used for the edge-side AI image processing. Although various function types of the edge AI image processing are conceivable, for example, the following types can be exemplified.

Class identification

Semantic segmentation

Human detection

Vehicle detection

Target tracking

Optical character recognition (OCR)

Among the above function types, the class identification is a function of identifying a class of the target. The term "class" described herein refers to information indicating a category of an object, and refers to, for example, classifications such as "person", "automobile", "airplane", "ship", "truck", "bird", "cat", "dog", "deer", "frog", "horse", and the like.

The target tracking is a function of tracking a target subject, and can be also described as a function of obtaining history information of the location of the subject.

The memory unit 45 is used as a storage destination for various types of data such as captured image data obtained by the image signal processing unit 42. Furthermore, in the present example, the memory unit 45 can also be used to temporarily store data that is used by the AI image processing unit 44 during the edge-side AI image processing.

Furthermore, the memory unit 45 stores information regarding an AI application and an AI model used by the AI image processing unit 44.

Note that the information regarding the AI application and the AI model may be loaded into the memory unit 45 serving as a container or the like using a container technology to be described below. It is possible to change, by loading the edge-side AI model used for the edge-side AI image processing into the memory unit 45, the function type of the AI image processing or change the AI model to an AI model whose performance has been improved by retraining.

Note that the above description has been given on the basis of the example of the AI model and the AI application used for image recognition in the present embodiment, but the present technology is not limited to such an example, and a program or the like executed using the AI technology may be targeted.

Furthermore, in a case where the memory unit 45 is small in capacity, after the information regarding the AI application and the AI model is loaded as a container into a memory such as the memory unit 34 located outside the image sensor IS using the container technology, only the AI model may be stored in the memory unit 45 located inside the image sensor IS via the communication I/F 46 to be described below.

The communication I/F 46 is an interface that communicates with the control unit 33, the memory unit 34, and the like located outside the image sensor IS. The communication I/F 46 performs communication for acquiring a program to be executed by the image signal processing unit 42, an AI application or an AI model to be used by the AI image processing unit 44, or the like from the outside, and stores the program, the AI application, the AI model, or the like in the memory unit 45 included in the image sensor IS.

Accordingly, the AI model is stored in a part of the memory unit 45 included in the image sensor IS so as to be available for use by the AI image processing unit 44.

The AI image processing unit 44 recognizes a subject according to a purpose by performing predetermined image recognition processing using the AI application or the AI model thus obtained.

The recognition result information of the AI image processing is output to the outside of the image sensor IS via the communication I/F 46.

That is, not only the image data output from the image signal processing unit 42 but also the recognition result information of the AI image processing is output from the communication I/F 46 of the image sensor IS.

Note that only either of the image data and the recognition result information can be output from the communication I/F 46 of the image sensor IS.

For example, in a case where the above-described function of retraining an AI model is used, captured image data used for the retraining function is uploaded from the image sensor IS to the cloud-side information processing device via the communication I/F 46 and the communication unit 35.

Furthermore, in a case where inference is performed using an AI model, recognition result information of the AI image processing is output from the image sensor IS to another information processing device located outside the camera 3 via the communication I/F 46 and the communication unit 35.

There are various possible configurations of the image sensor IS. Here, an example where the image sensor IS has a two-layer stacked structure will be described.

Figure 9:
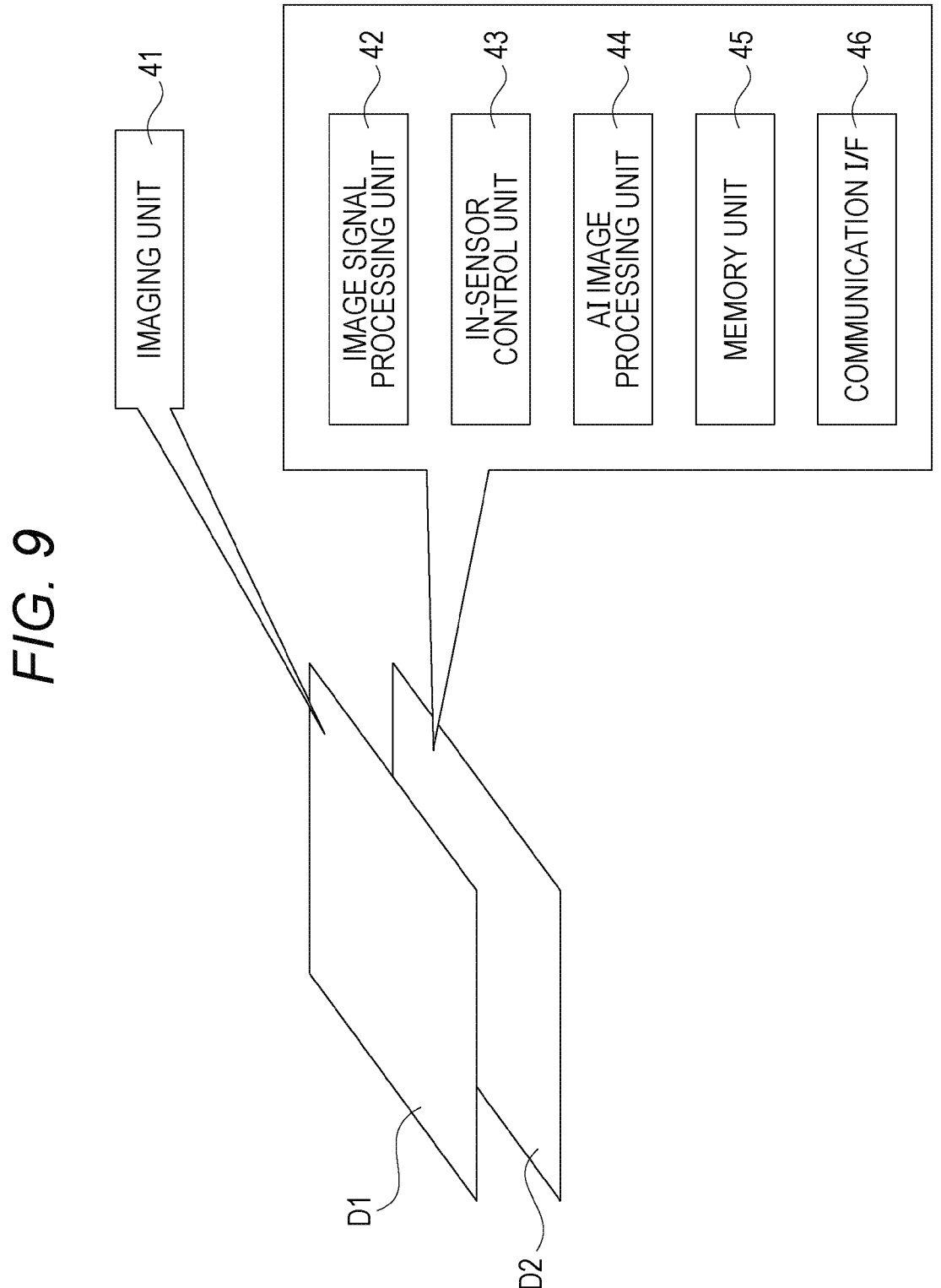
FIG. 9 is a diagram illustrating a configuration example of an image sensor.

As illustrated in FIG. 9, the image sensor IS is configured as a one-chip semiconductor device in which two dies are stacked on top of each other.

The image sensor IS includes a stack of a die D1 serving as the imaging unit 41 illustrated in FIG. 8 and a die D2 including the image signal processing unit 42, the in-sensor control unit 43, the AI image processing unit 44, the memory unit 45, and the communication I/F 46.

The die D1 and the die D2 are electrically connected to each other by, for example, Cu—Cu bonding.

There are various possible methods for loading an AI model, an AI application, or the like into the camera 3. An example using the container technology will be described.

Figure 10:
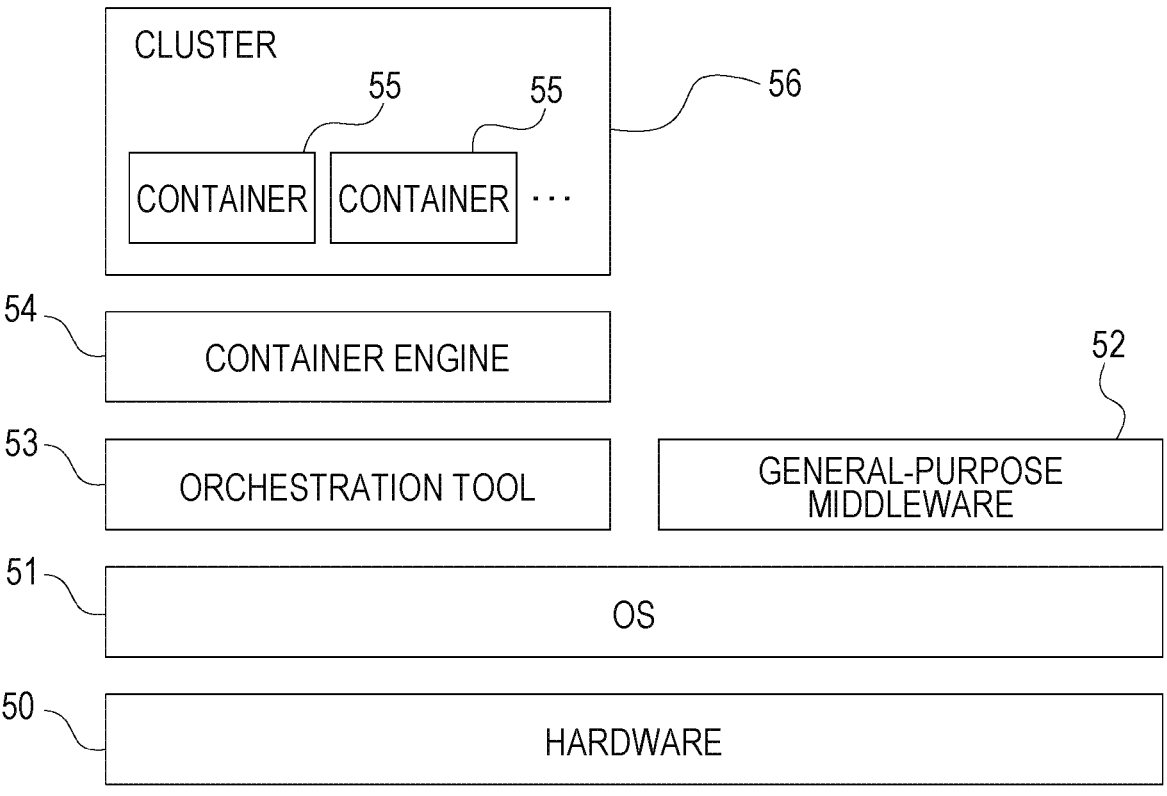
FIG. 10 is a block diagram illustrating a software configuration of the camera.

In the camera 3, an operating system 51 is installed on various types of hardware 50 such as a CPU or a graphics processing unit (GPU) as the control unit 33 illustrated in FIG. 8, a ROM, and a RAM (see FIG. 10).

The operating system 51 is basic software responsible for overall control of the camera 3 in order to realize various functions in the camera 3.

A general-purpose middleware 52 is installed on the operating system 51.

The general-purpose middleware 52 is, for example, software realizing basic operations such as a communication function using the communication unit 35 serving as the hardware 50 and a display function using a display unit (such as a monitor) serving as the hardware 50.

On the operating system 51, not only the general-purpose middleware 52 but also an orchestration tool 53 and a container engine 54 are installed.

The orchestration tool 53 and the container engine 54 constructs a cluster 56 as a runtime environment of containers 55 and load and run the containers 55.

Figure 5:
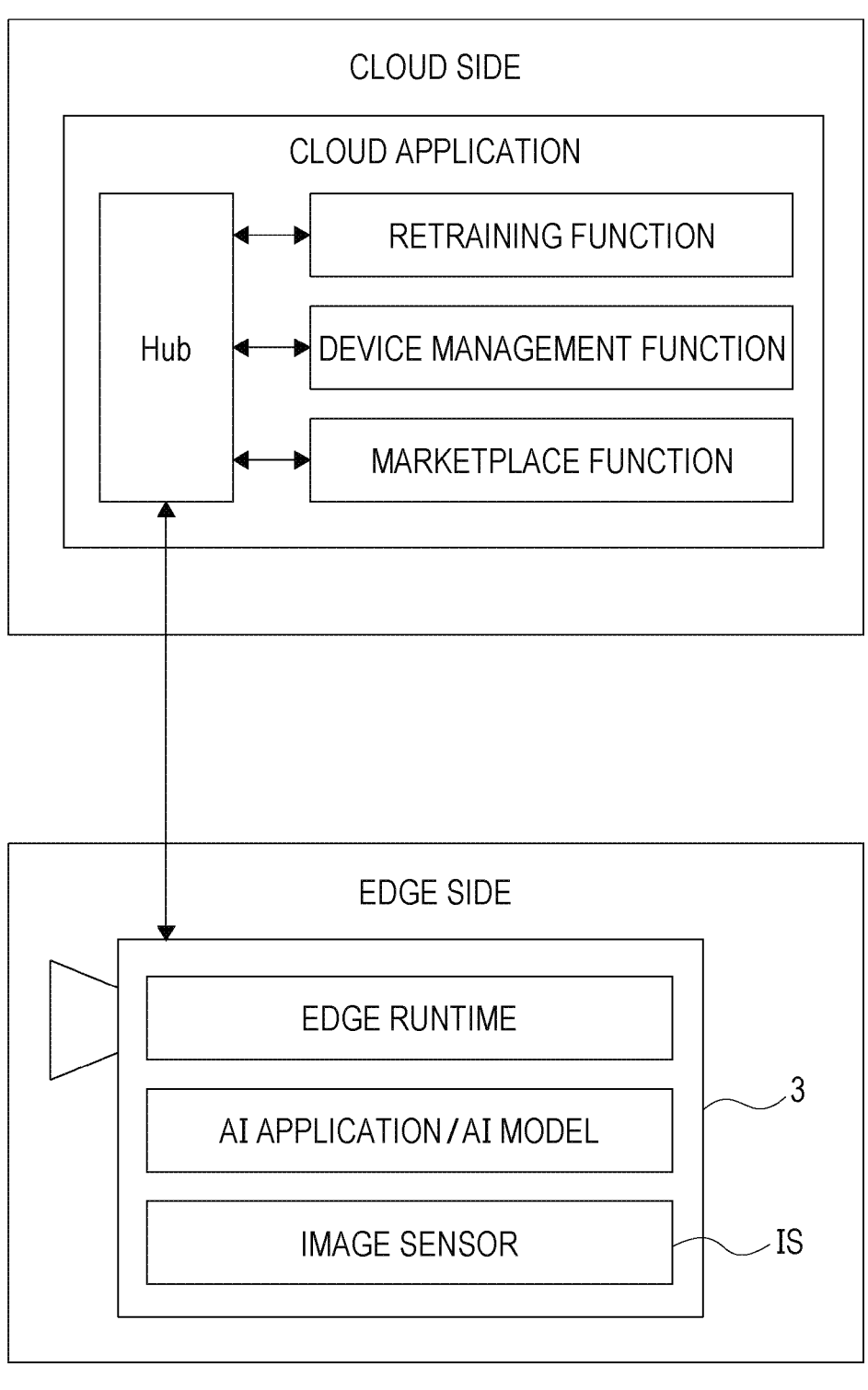
FIG. 5 is a diagram for describing a connection mode between the cloud-side information processing device and an edge-side information processing device.

Note that the edge runtime illustrated in FIG. 5 corresponds to the orchestration tool 53 and the container engine 54 illustrated in FIG. 10.

The orchestration tool 53 has a function of causing the container engine 54 to appropriately allocate resources of the above-described hardware 50 and operating system 51. Each container 55 is collected into a predetermined unit (pod to be described below) by the orchestration tool 53, and each pod is loaded into a worker node (to be described below) that is a logically different area.

The container engine 54 is one of pieces of middleware installed in the operating system 51 and is an engine that make the container 55 operate. Specifically, the container engine 54 has a function of allocating resources (memories, calculation capacities, and the like) of the hardware 50 and the operating system 51 to the containers 55 on the basis of configuration files or the like included in the middleware inside the containers 55.

Furthermore, in the present embodiment, the allocated resources include not only resources such as the control unit 33 included in the camera 3 but also resources such as the in-sensor control unit 43, the memory unit 45, and the communication I/F 46 included in the image sensor IS.

The container 55 includes an application and middleware such as a library for realizing a predetermined function.

The container 55 operates to realize the predetermined function using resources of the hardware 50 and the operating system 51 allocated by the container engine 54.

In the present embodiment, the AI application and the AI model illustrated in FIG. 5 correspond to one of the containers 55. That is, one of the various containers 55 loaded into the camera 3 realizes a predetermined AI image processing function using the AI application and the AI model.

A specific configuration example of the cluster 56 constructed by the container engine 54 and the orchestration tool 53 will be described with reference to FIG. 11. Note that the cluster 56 may be constructed across a plurality of devices such that functions are realized using not only the resources of the hardware 50 included in one camera 3 but also resources of other hardware included in the other devices.

The orchestration tool 53 manages the runtime environment of the container 55 on a per-worker node 57 basis. Furthermore, the orchestration tool 53 constructs a master node 58 that manages all of the worker nodes 57. In each worker node 57, a plurality of pods 59 is loaded. Each pod 59 includes one or a plurality of containers 55 and realizes a predetermined function. The pod 59 is a management unit managing the container 55 by the orchestration tool 53.

The pod 59 in the worker node 57 operates under the control of a pod management library 60.

The pod management library 60 includes a container runtime that causes the pod 59 to use logically allocated resources of the hardware 50, an agent that is subject to control from the master node 58, and a network proxy that is responsible for communication between the pods 59, communication with the master node 58, and the like.

That is, the pod management library 60 allows each pod 59 to realize a predetermined function using each resource.

The master node 58 includes an application server 61 that loads the pod 59, a manager 62 that manages how the container 55 is loaded by the application server 61, a scheduler 63 that determines a worker node 57 in which the container 55 is placed, and a data sharing unit 64 that performs data sharing.

Figure 11:
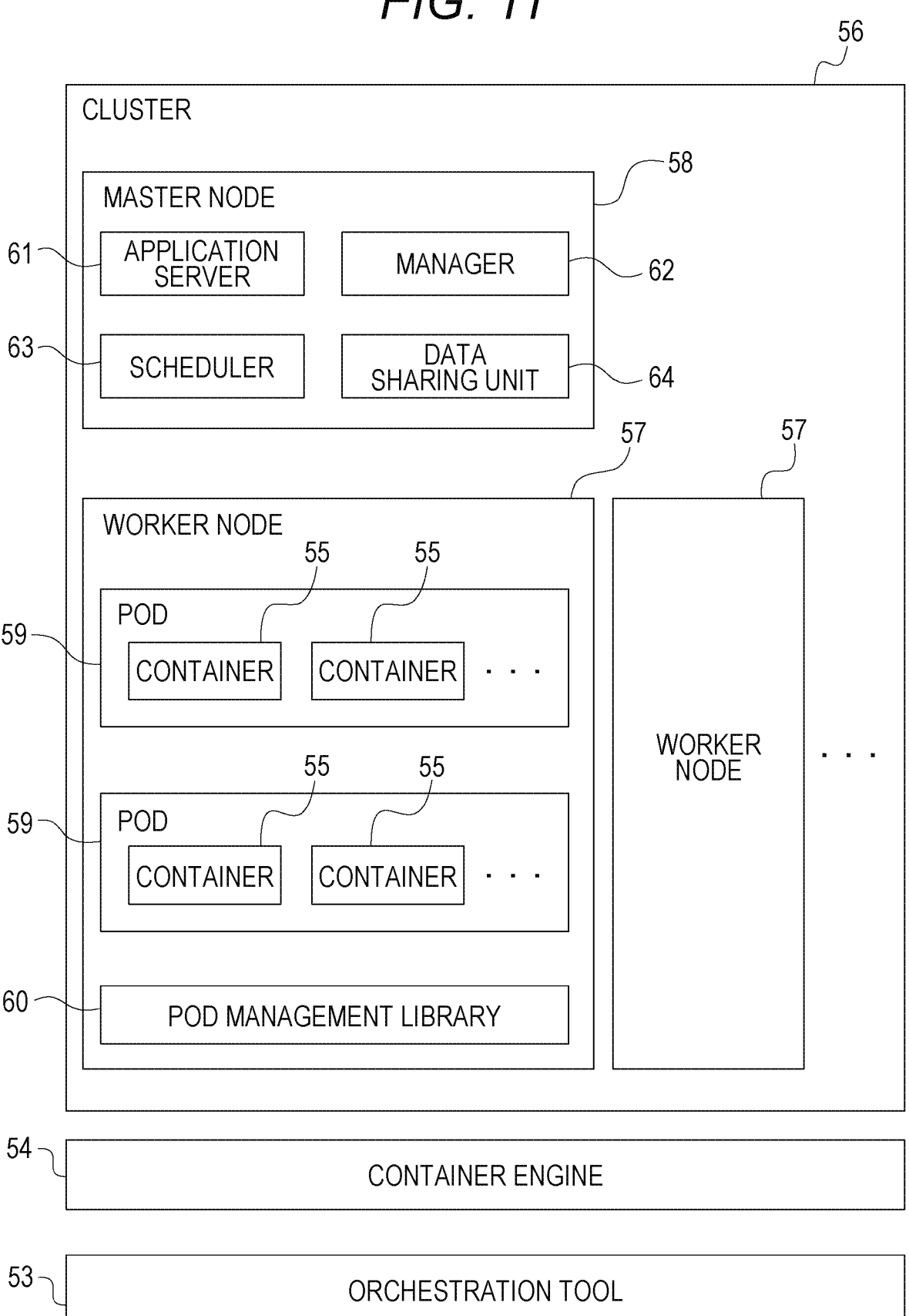
FIG. 11 is a block diagram illustrating a runtime environment of a container in a case where a container technology is used.

The use of the components illustrated in FIGS. 10 and 11 allows the above-described AI application and AI model to be loaded into the image sensor IS of the camera 3 using the container technology.

Note that, as described above, the configuration where the AI model is stored in the memory unit 45 in the image sensor IS via the communication I/F 46 in FIG. 8, and the AI image processing is performed in the image sensor IS may be employed, or alternatively, a configuration where the components illustrated in FIGS. 10 and 11 are loaded into the memory unit 45 and the in-sensor control unit 43 in the image sensor IS to run the above-described AI application and AI model in the image sensor IS using the container technology may be employed.

<1-5. Hardware Configuration of Information Processing Device>

Figure 12:
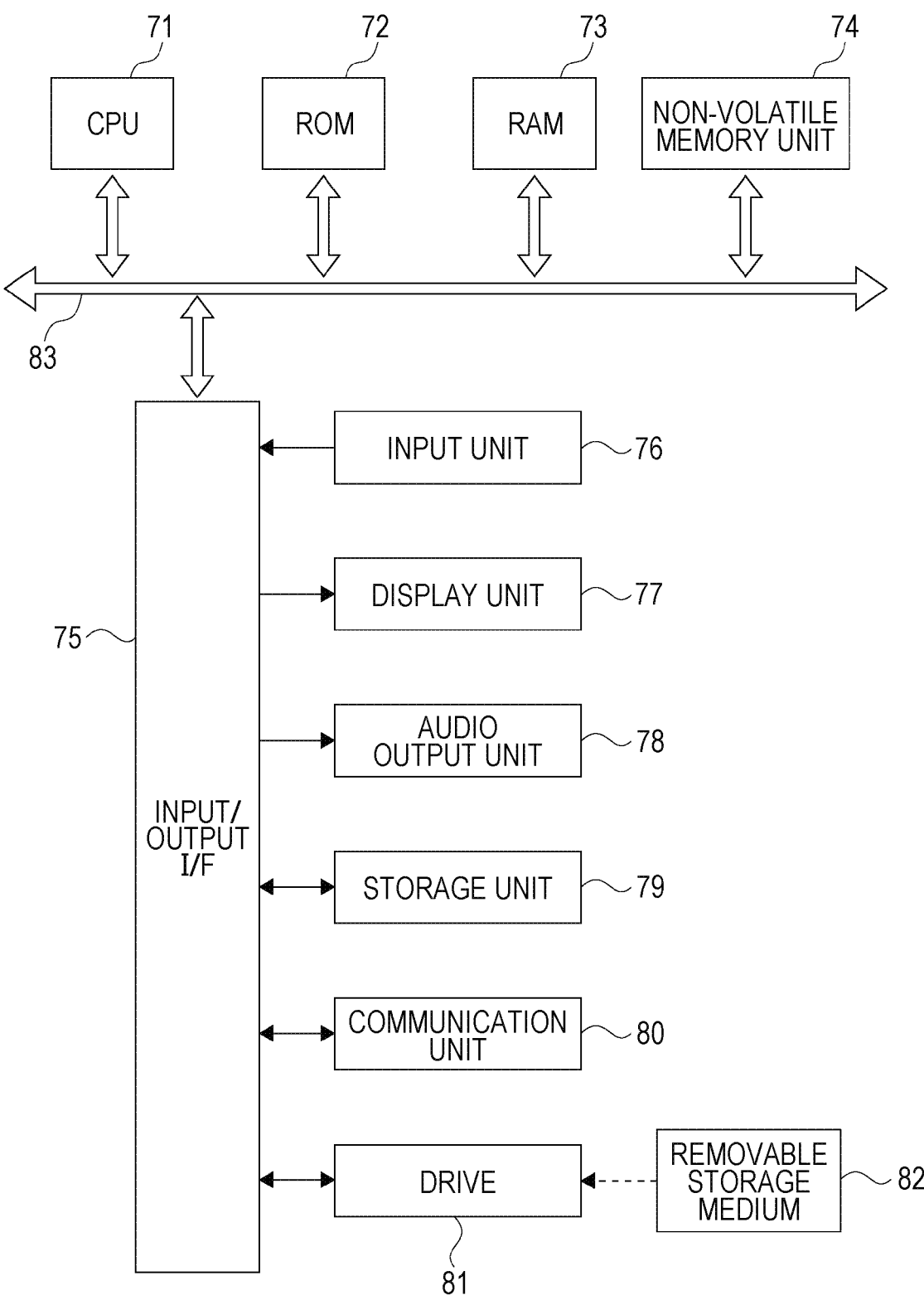
FIG. 12 is a block diagram illustrating an example of a hardware configuration of an information processing device.

A hardware configuration of the information processing device such as the cloud server 1, the user terminal 2, the fog server 4, and the management server 5 included in the information processing system 100 will be described with reference to FIG. 12.

The information processing device includes a CPU 71. The CPU 71 functions as an arithmetic processing unit that performs the above-described various types of processing, and performs various types of processing in accordance with a program stored in a non-volatile memory unit 74 such as a ROM 72 or, for example, an electrically erasable programmable read-only memory (EEP-ROM), or a program loaded from a storage unit 79 into a RAM 73. The RAM 73 also stores, as needed, data and the like necessary for the CPU 71 to perform the various types of processing.

Note that the CPU 71 included in the information processing device as the cloud server 1 includes a search processing unit and a transmission processing unit for realizing the above-described functions. Then, the search processing unit realizes the imaging setting search function F4 and the AI model search function F5.

The CPU 71, the ROM 72, the RAM 73, and the non-volatile memory unit 74 are connected to each other over a bus 83. An input/output interface (I/F) 75 is also connected to the bus 83.

An input unit 76 including an operation element or an operation device is connected to the input/output interface 75.

Possible examples of the input unit 76 include various types of operation elements or operation devices, such as a keyboard, a mouse, a key, a dial, a touch panel, a touch pad, and a remote controller.

A user operation is detected by the input unit 76, and a signal corresponding to the input operation is interpreted by the CPU 71.

Furthermore, a display unit 77 including an LCD, an organic EL panel, or the like, and an audio output unit 78 including a speaker or the like are integrally or separately connected to the input/output interface 75.

The display unit 77 is a display unit that performs various types of display, and includes, for example, a display device provided in a housing of a computer device, a separate display device connected to the computer device, or the like.

The display unit 77 displays an image for various types of image processing, a moving image to be processed, or the like, on a display screen on the basis of an instruction from the CPU 71. Furthermore, the display unit 77 displays various types of operation menus, icons, messages, and the like, that is, displays as a graphical user interface (GUI), on the basis of an instruction of the CPU 71.

There is a case where the storage unit 79 including a hard disk, a solid-state memory, or the like, and a communication unit 80 including a modem or the like is connected to the input/output interface 75.

The communication unit 80 performs communication processing over a transmission path such as the Internet, and performs wired/wireless communication, bus communication, or the like with various devices.

A drive 81 is also connected to the input/output interface 75 as needed, and a removable storage medium 82 such as a magnetic disk, an optical disc, a magneto-optical disk, or a semiconductor memory is mounted.

A data file such as a program used for each processing can be read from the removable storage medium 82 by the drive 81. The read data file is stored in the storage unit 79, and an image or audio included in the data file is output by the display unit 77 or the audio output unit 78. Furthermore, a computer program and the like read from the removable storage medium 82 is installed in the storage unit 79 as needed.

In such a computer device, for example, software for the processing of the present embodiment can be installed via network communication by the communication unit 80 or the removable storage medium 82. Alternatively, the software may be stored in advance in the ROM 72, the storage unit 79, or the like.

Furthermore, the captured image captured by the camera 3 and the processing result of the AI image processing may be received and stored in the storage unit 79 or the removable storage medium 82 via the drive 81.

The CPU 71 performs processing operations on the basis of the various programs to perform information processing or communication processing necessary for the cloud server 1 serving as the information processing device including the above-described arithmetic processing unit.

Figure 6:
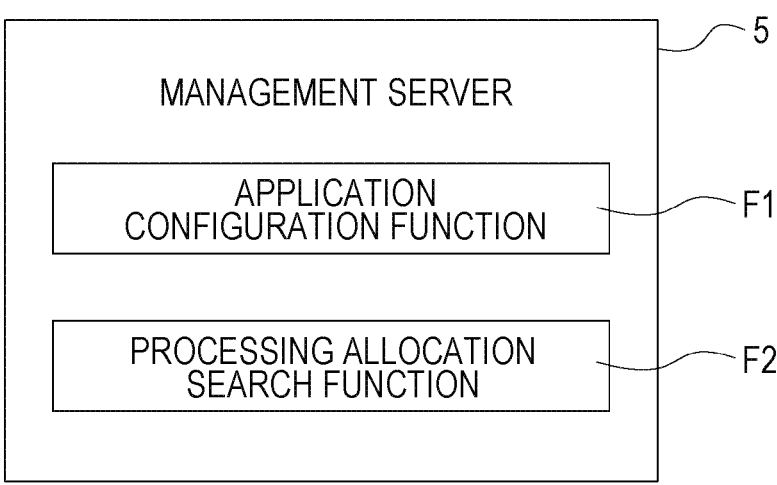
FIG. 6 is a functional block diagram of a management server.

Note that the cloud server 1 is not limited to a single computer device as illustrated in FIG. 6 and may be configured as a system including a plurality of computer devices. The plurality of computer devices may be systematized by a local area network (LAN) or the like, or may be arranged in a remote place by a virtual private network (VPN) or the like using the Internet or the like. The plurality of computer devices may include a computer device as a server group (cloud) that can be used by a cloud computing service.

2. Search Processing as First Embodiment

In the search processing as the first embodiment, an imaging setting search and an edge-side AI model search are performed.

A specific processing flow will be described with reference to FIGS. 13 and 14.

First, the user operates the user terminal 2 to select an AI application for obtaining desired analysis information from captured image data captured by the camera 3. Note that, in the following description, the AI application may be simply referred to as "application".

The application is used for, for example, store monitoring, traffic monitoring, grasping of a customer flow line, or the like as described above, and can be described as a purpose of performing AI image processing.

Note that there is not only a case where one AI application exists according to the purpose (application), but also a case where a plurality of AI applications exists according to the purpose.

Specifically, for example, there is a case where a plurality of AI applications for achieving the purpose of "store monitoring" is prepared. In this case, the user may select the purpose of "store monitoring", or may select one AI application from among a plurality of AI applications prepared for achieving the purpose of "store monitoring". In the former case, that is, in a case where the user selects the "purpose", it can be realized by replacing the "application" in the following description with the "purpose".

Note that, as an example, a list of the above-described purposes such as "store monitoring" and "traffic monitoring" and a plurality of the above-described AI applications (for example, an AI application of attribute recognition) is displayed on the user terminal 2 as a marketplace, and the user selects a desired purpose or a desired AI application from among the purposes and the applications, so as to achieve the above-described selection.

Upon receipt of the application selection operation, the user terminal 2 performs processing of transmitting information regarding the selected application to the management server 5 in step S101.

The management server 5 receives the application selection information from the user terminal 2 in step S201.

Note that the management server 5 receives environment information from the user terminal 2 together with the application selection information. The environment information is information regarding an environment where the camera 3 is installed, and may be information regarding a location where the camera 3 is installed, such as inside a store, outdoors, or inside a vehicle, or information indicating a positional relation between the camera 3 and a light source such as the sun, such as back light, front light, or side light. Furthermore, information indicating a subject to be detected may be included in the environment information, and specifically, the moving speed of the subject or the like is included.

Furthermore, the information regarding the installation location may be information such as not only indoors and outdoors but also a public road, in a park, or the like, and may be more detailed information such as a highway, an alley, a freeway, or the like.

The environment information may be information input by the user, or may be information obtained as a result of performing analysis processing on the captured image.

Furthermore, in a case where the information is input by the user, the above-described environment information may be displayed as a list so that the environment information can be selected on the marketplace, and the user may select the environment information, for example, when selecting the purpose or the plurality of AI applications.

The management server 5 selects an optimum imaging setting in accordance with the application in step S202. Note that the term optimum described herein does not refer to an actually optimum imaging setting, but refers to an imaging setting presumed to be optimum by the management server 5.

Subsequently, the management server 5 selects an optimum edge-side AI model in accordance with the application in step S203. The optimum edge-side AI model described herein also refers to an edge-side AI model presumed to be optimum by the management server 5. Note that, in this processing, an AI application using the edge-side AI model is also simultaneously selected.

In the management server 5, data up to now has been accumulated as big data, and a plurality of applications, environment information, edge-side AI models applied to the imaging device, and recognition result information thereof are managed in association with each other. The recognition result information is information such as a recognized subject or numerical information such as recognition accuracy or likelihood.

A cause-and-effect relation among such pieces of big data have been analyzed by means of analysis processing, and knowledge such as how the environment information changed affects the recognition result information has been obtained. Then, an edge-side AI model to be selected for improving the performance of the AI image processing or the like can also be specified by analysis.

In the management server 5, an imaging setting with which the best recognition result information is obtained with a combination closest to the application and the environment information selected by the user this time is selected as the optimum imaging setting.

For example, it is assumed that there are an imaging setting and an edge-side AI model with which the best recognition result is obtained when detecting a sedan-type vehicle. Then, in a case where the same camera 3 is used to detect a bus this time, if it is determined that the bus and the sedan-type vehicle as subjects are similar in characteristics to each other, the imaging setting and the edge-side AI model used when detecting the sedan-type vehicle are presumed to be optimum and selected.

In step S204, the management server 5 transmits, to the camera 3, the imaging setting selected in step S202 and the edge-side AI model selected in step S203. In this processing, not only the edge-side AI model but also the AI application is transmitted to the camera 3.

After receiving the imaging setting and the edge-side AI model from the management server 5, the camera 3 performs processing of updating the imaging setting in step S301. This processing is processing of applying the imaging setting received from the management server 5 to the camera 3.

Next, in step S302, the camera 3 performs processing of updating (loading) the edge-side AI model received from the management server 5.

It is possible to apply, by performing the processing of step S301 and the processing of step S302 in the camera 3, the imaging setting and the edge-side AI model determined to be optimum by the management server 5 to the camera 3 and obtain appropriate captured image data and recognition result information as initial values.

The recognition result information is, for example, class identification information regarding the detected subject, its likelihood (such as 90%), a detection position (pixel position in the captured image), and the like.

The camera 3 performs edge-side AI image processing on the captured image in step S303.

The camera 3 transmits the captured image data and the recognition result information to the cloud server 1 in step S304. Information is transmitted to the cloud server 1 via the fog server 4, but may be directly transmitted to the cloud server 1.

FIG. 14 illustrates processing after the camera 3 transmits the captured image data and the recognition result information to the cloud server 1.

The cloud server 1 receives the captured image data and the recognition result information in step S401, and performs cloud-side AI image processing in subsequent step S402.

The cloud-side AI image processing is processing performed on the received captured image. Furthermore, the cloud-side AI image processing is performed using a cloud-side AI model different from the edge-side AI model used for the edge-side AI image processing.

The cloud-side AI model is an AI model higher in performance than AI model as compared with the edge-side AI model, and if the cloud-side AI model and the edge-side AI model are CNN, at least part of the number of layers, the number of channels, the filter size, the stride, or the like is different. Specifically, the cloud-side AI model is larger in the number of layers, the number of channels, and the filter size and smaller in the stride than the edge-side AI model.

As a result, the cloud-side AI model has high performance, but is higher in operation cost, memory size to be used, and the like than the edge-side AI model.

The cloud server 1 performs processing of comparing the recognition result information in step S403. Specifically, the recognition result information received from the camera 3 is compared with the recognition result information of the cloud-side AI image processing using the cloud-side AI model, and it is determined whether or not the result obtained by the camera 3 is equivalent to the recognition result information obtained by the cloud server 1. Note that, if a difference in recognition result information between both sides is within an allowable range, it is determined in step S403 that the equivalent result has been obtained.

In a case where the equivalent recognition result information has been obtained, the cloud server 1 need not perform the subsequent processing illustrated in FIG. 14.

In a case where the equivalent recognition result information has not been obtained, it is determined that the imaging setting or the edge-side AI model of the camera 3 is not optimum.

In this case, the cloud server 1 first performs imaging setting search processing of searching for an appropriate imaging setting to be set for the camera 3 in step S404. The imaging setting search processing is performed using search AI.

A search AI model, which is an AI model used for search AI, is an AI model built by learning a cause-and-effect relation among the camera setting of the camera 3, the detection target (a moving object, a person, or the like) detected from the captured image captured by the camera 3, the environment information, which is information regarding conditions such as a location where the camera 3 is installed and a light source, and the moving speed of the detection target, and the recognition result information as training data. That is, the search AI model is an AI model obtained by learning the above-described big data as training data.

In the imaging setting search processing in step S404, when the environment information is input as a variable into such a search AI model, an imaging setting with which recognition result information equivalent to or close to the recognition result information obtained by the cloud server 1 can be obtained is searched for.

For example, in a case where the detection target is a moving object, and the moving speed of the moving object is high, a setting with which the light receiving time becomes as short as 8 msec, the ISO sensitivity becomes high, blur correction is enhanced, and the HDR is ON is obtained by means of the imaging setting search.

Alternatively, for a camera 3 responsible for monitoring whether or not a resist liquid is correctly applied in semiconductor manufacturing, performing AI image processing on a black-and-white image, enhancing sharpness enhancement processing, or the like is searched for as an imaging setting.

In such a search for the imaging setting information, pre-searched results may be stored in the cloud server 1 in the form of a list. That is, in the processing of step S404, one piece of imaging setting information may be selected from the list on the basis of the environment information.

Note that the search processing may be performed periodically or on an as-needed basis. The appropriate imaging setting information corresponding to the environment information merely indicates an imaging setting presumed to be suitable, and is not necessarily optimum among the imaging settings. Furthermore, data regarding the environment information, the imaging setting, and the recognition result information is accumulated day by day, and it is undeniable that more appropriate imaging setting information can be found by performing new search processing.

Performing the processing of searching for new imaging setting information each time the processing of step S404 is performed allows an increase in possibility that more appropriate imaging setting information is searched for.

Next, in step S405, the cloud server 1 performs AI model search processing of searching for an edge-side AI model for obtaining a satisfactory AI image processing result.

The AI model search processing is, for example, processing of searching for an optimum numerical value for a weighting factor set between nodes of the edge-side AI model.

This search processing can be described as processing of retraining the edge-side AI model so as to obtain, using a captured image that makes the recognition result information of the edge-side AI image processing and the recognition result information of the cloud-side AI image processing different from each other as an input, the recognition result information of the cloud-side AI image processing.

For example, for a certain captured image, it is assumed that the possibility that a sedan-type vehicle is imaged is 10% in the recognition result information of the edge-side AI image processing using the edge-side AI model, whereas the possibility that a sedan-type vehicle is imaged is 90% in the recognition result information of the cloud-side AI image processing using the cloud-side AI model.

Since the cloud-side AI model is higher in performance than the edge-side AI model, the recognition result information using the cloud-side AI model is treated as correct recognition result information in this case.

Then, in the AI model search processing in step S405, the cloud server 1 searches for an edge-side AI model, for example, performs processing of correcting the weighting factor described above so as to make a difference in recognition result information small, specifically, to obtain recognition result information indicating that there is a high possibility that the sedan-type vehicle is imaged.

The edge-side AI model thus obtained is transmitted to the management server 5 in the processing of step S406 of the cloud server 1 together with the imaging setting obtained in step S403.

The management server 5 receives the imaging setting and the edge-side AI model from the cloud server 1 in step S205.

Next, the management server 5 stores the imaging setting and the edge-side AI model obtained by the search processing, and transmits the imaging setting and the edge-side AI model to the camera 3 in step S206.

The camera 3 receives the imaging setting and the edge-side AI model from the management server 5, and updates the imaging setting in step S305. Moreover, the camera 3 performs processing of updating the edge-side AI model in step S306.

Figure 13:
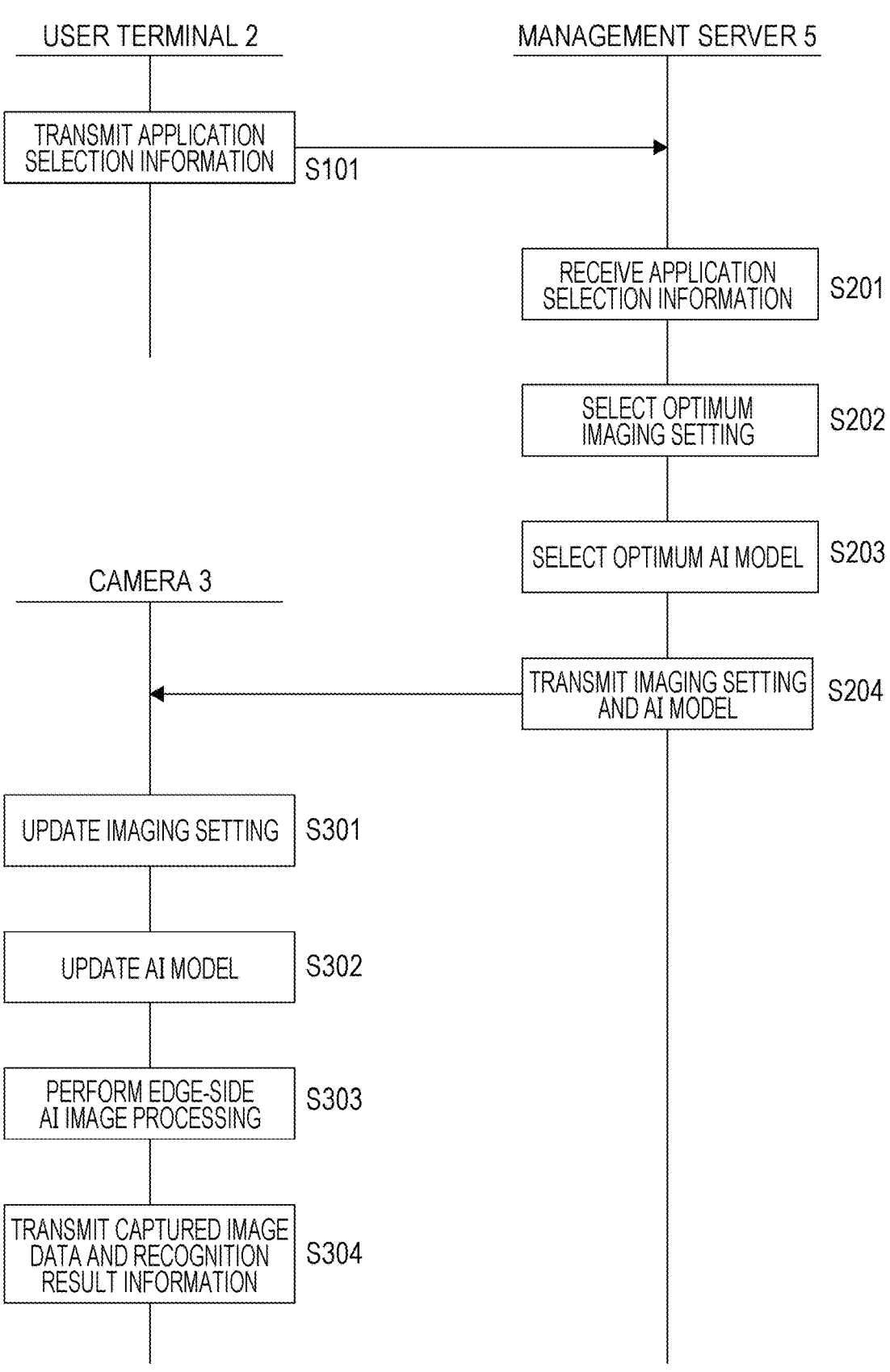
FIG. 13 is a diagram illustrating an example of a flow of processing performed by each device according to a first embodiment.

When the devices perform their respective processing illustrated in FIGS. 13 and 14, the recognition result of the edge-side AI image processing in the camera 3 becomes equivalent to the recognition result obtained using the cloud-side AI model. In other words, the recognition result of the edge-side AI image processing becomes appropriate.

This allows the fog server 4 and the cloud server 1 to obtain analysis information regarding a subject flow line and analysis information regarding a vehicle on the basis of the recognition result information.

Note that, in the search for an edge-side AI model described above, basically, an edge-side AI model that improves the quality of recognition result information is searched for. However, regardless of the above, an edge-side AI model may be searched for so as to improve overall performance.

For example, in a case where the memory usage becomes tight and the processing speed drops significantly when the camera 3 performs the image recognition processing using the edge-side AI model, an edge-side AI model that makes the processing time shorter even if the quality of the recognition result information slightly deteriorate may be searched.

That is, the processing of searching for an edge-side AI model in the present example may be performed with the performance of the camera 3 taken into consideration. Herein, the performance of the camera 3 corresponds to the processing performance of the arithmetic processing unit included in the camera 3, the capacity of the memory included in the camera 3, the capacity of the storage unit, and the like. Furthermore, an allowable processing time and the like may be taken into consideration for the edge-side AI image processing.

For example, in a case where the capacity of the memory included in the camera 3 is small, an edge-side AI model that reduces a memory space used by the edge-side AI image processing is searched for.

Alternatively, in a case where the capacity of the storage unit included in the camera 3 is small, an edge-side AI model smaller in size is searched for.

Moreover, in a case where it is necessary to make the processing time of the edge-side AI image processing shorter, an edge-side AI model that makes a time from the input of the captured image to the output of the recognition result information shorter, that is, an edge-side AI model that is lower in computational complexity is searched for.

Note that such a desire to make the processing time longer or shorter may also be input by the user from the marketplace as the above-described environment information, or items desired by the user (for example, emphasis on speed, emphasis on recognition rate, or the like) may be provided on the marketplace so as to allow the user to select from the items.

Furthermore, in a case where the edge-side AI model search is performed with the performance of the camera 3 taken into consideration, the performance of the camera 3 for the edge-side AI image processing may be taken into consideration.

Here, information regarding the performance of the camera 3 and the like may be designed to be automatically transmitted from the camera 3 to the cloud server 1 or the like when the camera 3 is connected to the cloud server 1, or may be manually registered in the cloud server 1 by the user via the marketplace or the like.

For example, an edge-side AI model may be searched for with the processing performance of the camera 3, the memory capacity, the access speed to the memory, and the like when the edge-side AI image processing is performed on the captured image obtained by means of the imaging operation taken into consideration.

Such an edge-side AI model search is generally known as a technique called knowledge distillation.

Note that, in the present embodiment, the example where the imaging setting search and the edge-side AI model search are performed on the assumption that the environment information input by the user is correct.

The environment information input by the user, however, may be incorrect.

For example, there is a case where it is presumed that a captured image captured in a front light environment is obtained on the basis of information input by the user. However, as a result of analyzing the captured image actually received from the camera 3, there is a case where it can be presumed that the captured image is captured in a back light environment. Furthermore, contrary to the presumption from the information input by the user, there is a case where it is presumed that the captured image is captured under moonlight, a case where it is presumed that the captured image is captured at night, or the like.

Alternatively, the moving speed of the subject based on the environment information input by the user may be different from the moving speed of the subject presumed from the captured image.

Such a situation may occur, for example, in a case where the orientation of the camera 3 when the user installs the camera 3 is different from the current orientation of the camera 3, in a case where the user misunderstands the moving speed of the subject, in a case where the user misunderstands the time zone in which the image is captured, or the like.

In such a case, it is desirable that the imaging setting search processing of step S404 or the edge-side AI model search processing of step S405 be performed on the assumption that the environment information input by the user is not correct, but the environment information obtained through the image analysis is correct.

That is, each search processing may be performed while correcting the environment information input by the user.

Furthermore, the processing of correcting the environment information may be performed in synchronization with the cloud-side AI image processing in step S402. That is, in the cloud-side AI image processing of step S402, processing of detecting the subject to be detected and presuming the environment in which the captured image is obtained or the information regarding (moving speed or the like of) the subject may be performed.

3. Search Processing as Second Embodiment

Search processing according to a second embodiment is to appropriately distribute, to each device including the camera 3, the fog server 4, the management server 5, and a cloud server 1A, each processing to be performed to achieve the purpose of the application designated by the user.

Examples of the processing to be distributed include comparison processing in step S403 in FIG. 14, analysis processing that is performed to achieve the purpose of the application, display processing or presentation processing of presenting the analysis information to the user, and cloud-side AI image processing.

Furthermore, other than the above-described processing, the processing to be distributed may include various processing that is performed until the user obtains the analysis information regarding the application.

Figure 15:
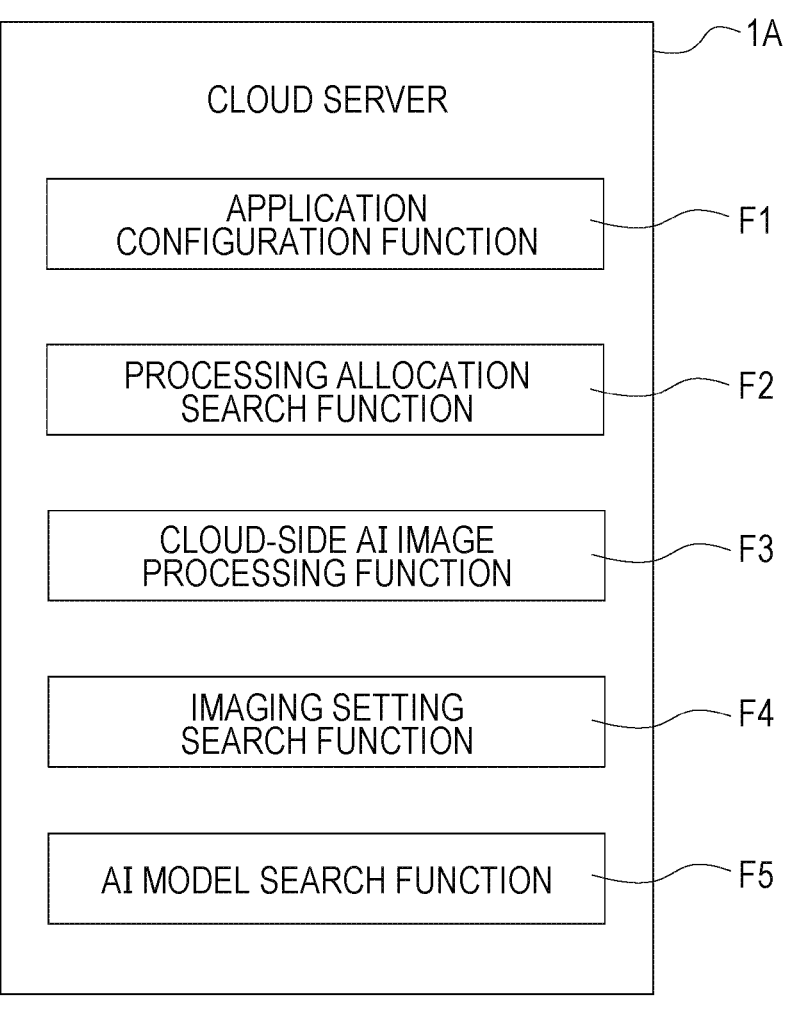
FIG. 15 is a functional block diagram of a cloud server according to a second embodiment.

In the present embodiment, it is assumed that the cloud server 1A performs search processing for distributing processing, and FIG. 15 illustrates a functional configuration of the cloud server 1A.

Note that, as illustrated in FIGS. 6 and 7, the management server 5 may perform the search processing.

The cloud server 1A has the application configuration function F1 and the processing allocation search function F2 in addition to the cloud-side AI image processing function F3, the imaging setting search function F4, and the AI model search function F5. That is, the cloud server 1A according to the present embodiment is a server device obtained by integrating the functions of both the cloud server 1 and the management server 5 according to the first embodiment.

Since each function has been described above, the description thereof will be omitted.

In order to determine processing distribution, the cloud server 1A performs machine learning in advance. As a result, the cloud server 1A acquires a processing distribution AI model used to determine processing distribution.

In pre-training, big data is used. The big data contains a type of an application, information regarding the camera 3, a captured image to be analyzed, information regarding an operating system (OS) used for processing and a processing time, information indicating how much capacity of each device is consumed such as a utilization rate of an arithmetic function of each device and a utilization rate of a memory capacity, and each information such as a processing time with such pieces of information associated with each other. Furthermore, in a case where a store having a plurality of cameras 3 is monitored, information such as the size of the store is also contained in the big data. That is, information regarding a monitoring target, information regarding a detection target, or the like may be contained.

Furthermore, other cost information such as a price of each device may be contained.

Figure 16:
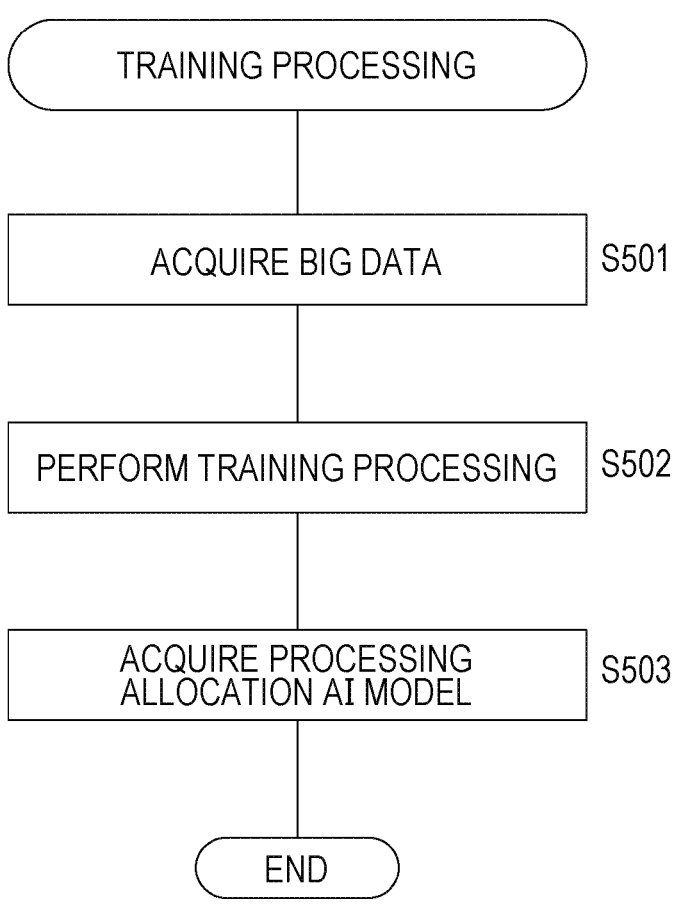
FIG. 16 is a flowchart of processing performed by the cloud server as pre-training according to the second embodiment.

FIG. 16 illustrates a flowchart of specific processing that is performed by the cloud server 1A in pre-training.

The cloud server 1A acquires big data in step S501.

Subsequently, the cloud server 1A performs machine learning in step S502. This machine learning causes the cloud server 1A to acquire a processing allocation AI model as an AI model for processing allocation search in step S503.

In a case where the big data is accumulated over time, the cloud server 1A may perform the processing illustrated in FIG. 16 each time data is accumulated or at regular time intervals.

It is therefore possible to update the processing allocation AI model on the basis of the latest big data.

Figure 17:
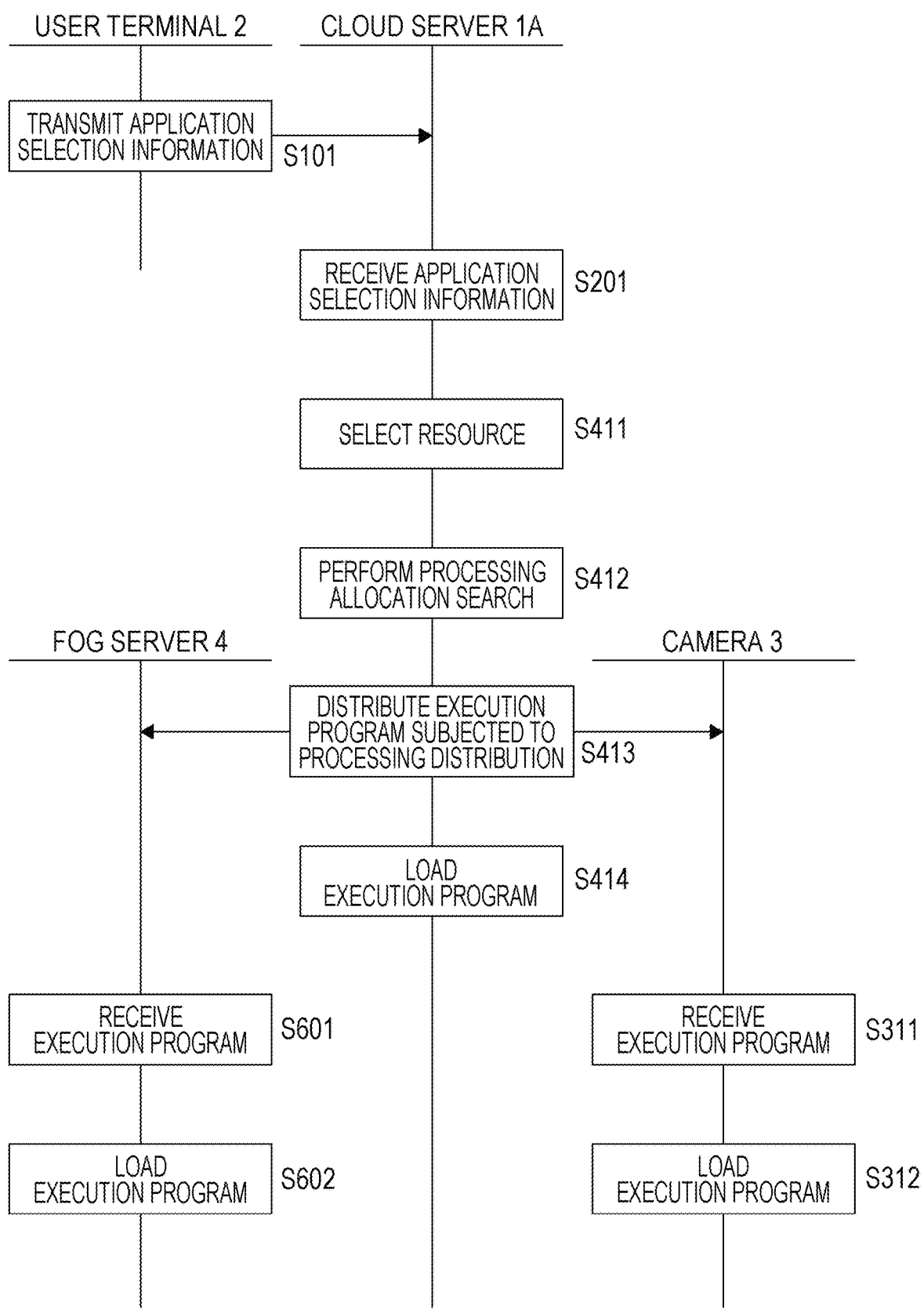
FIG. 17 is a diagram illustrating an example of a flow of processing performed by each device according to the second embodiment.

FIG. 17 illustrates an example of processing that is performed by each device in a case where the processing allocation AI model is actually used.

Upon receipt of a user operation of selecting an application for obtaining desired analysis information from the captured image captured by the camera 3, the user terminal 2 transmits application selection information to the cloud server 1A in step S101.

After receiving the application selection information in step S201, the cloud server 1A performs resource selection processing in step S411. The resource selection processing is processing of selecting information regarding each device such as the camera 3 or the fog server 4 used for realizing the application, the above-described environment information, or the like.

The resource selection processing may be performed on the basis of the information input by the user, or may be performed on the basis of registration information in a case where, for example, a surveillance camera or an information processing device provided in a store is registered in advance.

As the information regarding each device such as the camera 3, the specification information may be input by the user, or alternatively, the information regarding each device may be specified indirectly by means of the input of the manufacturer information, the model name, the model number information, or the like of the camera 3. The same applies to information regarding the information processing device such as the fog server 4.

The cloud server 1A performs the processing allocation search using the above-described processing allocation AI model in step S412. As a result, a search result as to what processing is performed by each device is obtained.

In step S413, the cloud server 1A generates an execution program in accordance with processing distribution as the search result for each device, and transmits the execution program to each device.

Accordingly, the fog server 4 receives the execution program in step S601, and loads the execution program in step S602.

Similarly, the camera 3 receives the execution program in step S311, and loads the execution program in step S312.

Furthermore, the cloud server 1A also load the execution program in step S414.

As a result, the fog server 4, the camera 3, and the cloud server 1A perform corresponding processing in accordance with the processing allocation.

4. Search Processing as Third Embodiment

According to a third embodiment, the frequency of transmission and reception of information regarding privacy is minimized between an information processing device arranged on the edge side (for example, the store side) such as a camera 3B and the fog server 4 and an information processing device arranged on the cloud side such as a cloud server 1B and the management server 5.

Here, according to the first embodiment, a captured image captured by the camera 3B is transmitted to the cloud server 1, so as to allow the cloud server 1 to perform, using the captured image, the imaging setting search, perform the edge-side AI model search, or retrain the AI model.

On the other hand, according to the third embodiment, the imaging setting search and the edge-side AI model search are appropriately performed while reducing the frequency of transmission and reception of information regarding privacy by transmitting a substitute image obtained by processing the captured image from the camera 3B to the cloud server 1B.

Figure 18:
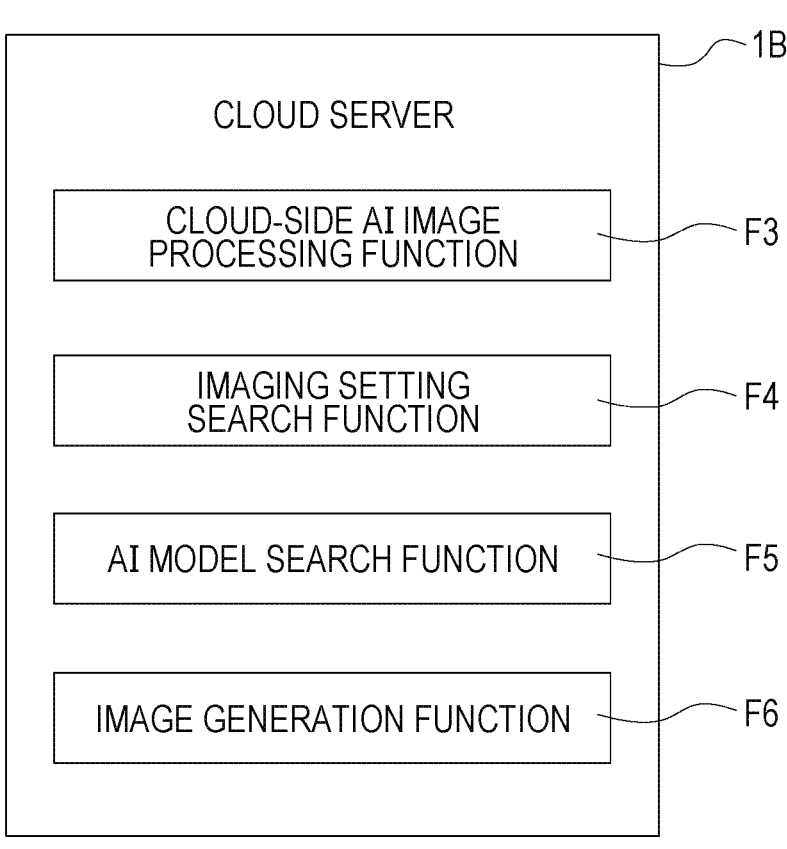
FIG. 18 is a functional block diagram of a cloud server according to a third embodiment.

FIG. 18 illustrates a functional configuration of the cloud server 1B.

The cloud server 1B has an image generation function F6 in addition to the cloud-side AI image processing function F3, the imaging setting search function F4, and the AI model search function F5.

The image generation function F6 is a function of generating a virtual image on the basis of the captured image captured by the camera 3B.

There are several possible virtual image generation methods.

For example, the cloud server 1B may receive, from the camera 3B, information regarding an imaging environment where the captured image is captured, and generate a virtual image in accordance with the information.

Alternatively, the cloud server 1B may receive, from the camera 3B, a background image without any person or object imaged, and generate a virtual image by superimposing a person image on the received background image. The person image used this time need not necessarily be received from the camera 3B, and may be an imaginary person image generated by or recorded in the cloud server 1B, or may be a person image that does not cause a privacy problem.

Furthermore, the position where the person image is superimposed may be an imaging position of a person as a subject in the captured image captured by the camera 3B. In this case, information indicating the superimposition position is transmitted from the camera 3B to the cloud server 1B.

In the following example, the camera 3B transmits a background image to the cloud server 1B.

Figure 19:
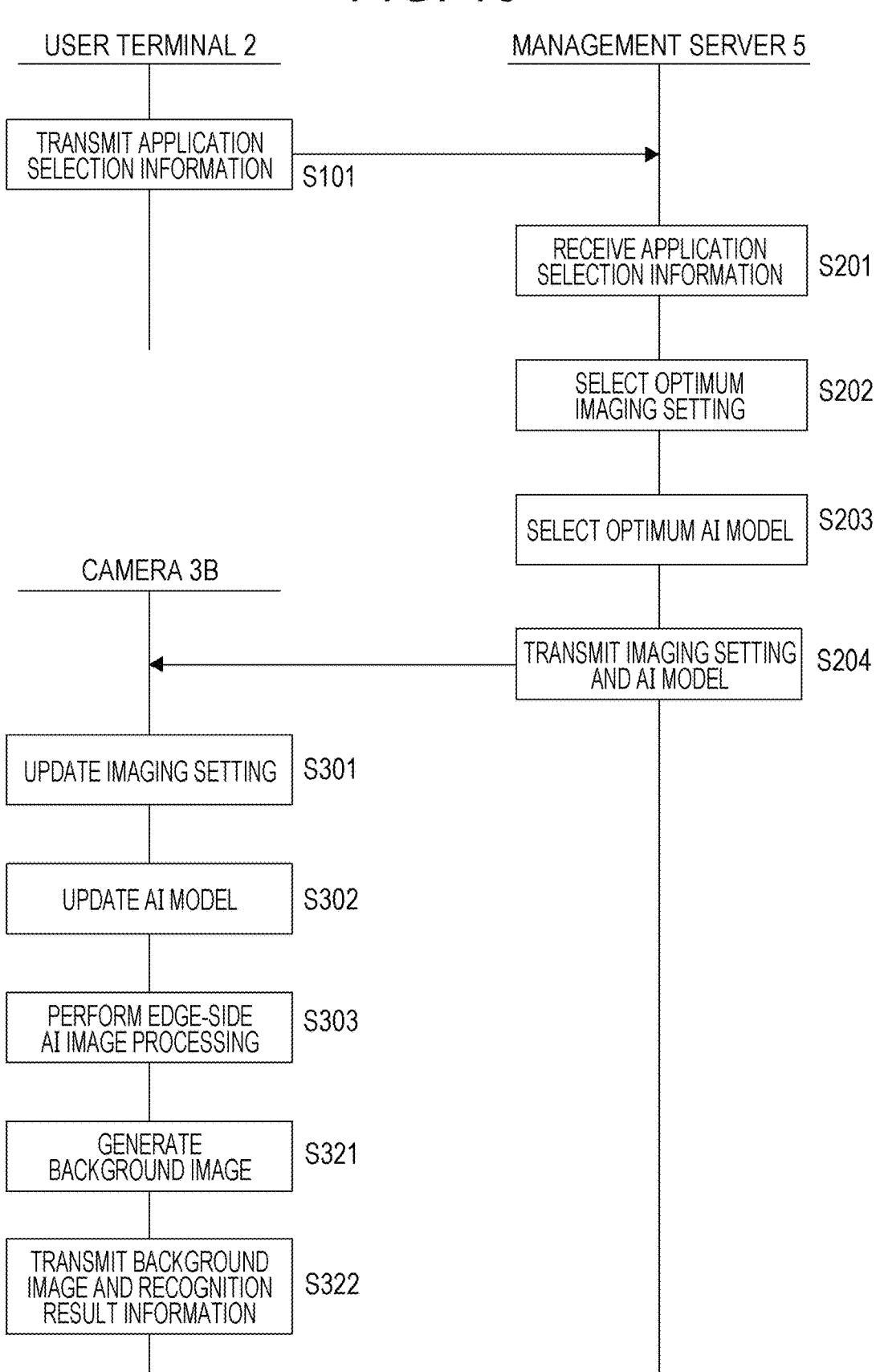
FIG. 19 is a diagram illustrating an example of a flow of processing performed by each device according to the third embodiment.

A specific processing flow of each device according to the present embodiment will be described with reference to FIGS. 19 and 20.

Note that processing similar to the processing in FIGS. 13 and 14 referred to in the first embodiment is denoted by the same step number, and description thereof will be omitted as needed.

In step S101, the user terminal 2 transmits information regarding an application selected by the user to the management server 5.

In step S201, the management server 5 receives the application selection information and the environment information from the user terminal 2.

The management server 5 selects an optimum imaging setting in accordance with the application in step S202.

Subsequently, the management server 5 selects an optimum edge-side AI model in accordance with the application in step S203.

In step S204, the management server 5 transmits, to the camera 3B, the imaging setting selected in step S202 and the edge-side AI model selected in step S203.

After receiving the imaging setting and the edge-side AI model from the management server 5, the camera 3B performs processing of updating the imaging setting in step S301.

Next, in step S302, the camera 3B performs processing of updating the edge-side AI model received from the management server 5.

In step S303, the camera 3B performs edge-side AI image processing on the captured image. Such edge-side AI image processing may be performed, for example, by the AI image processing unit 44 that performs processing using the AI model in the image sensor IS in FIG. 8 described above.

Performing the edge-side AI image processing in the image sensor IS as described above allows privacy to be protected more strongly.

In step S321, the camera 3B generates a background image. The background image may be obtained by removing a person from a captured image in which the person is imaged. For example, the background image may be generated by combining regions where any person or object is not imaged from a plurality of captured images, or may be a captured image obtained by capturing a moment when no person or object is within the angle of view.

In the processing of generating such a background image, for example, the AI image processing unit 44 that performs processing using the AI model in FIG. 8 described above may perform processing of recognizing a person or the like from the captured image and removing the recognized person from the captured image, and extract position information regarding the removed person image in the image.

In step S322, the camera 3B transmits the background image and the recognition result information to the cloud server 1B. Information is transmitted to the cloud server 1B via the fog server 4, but may be directly transmitted to the cloud server 1B.

Figure 20:
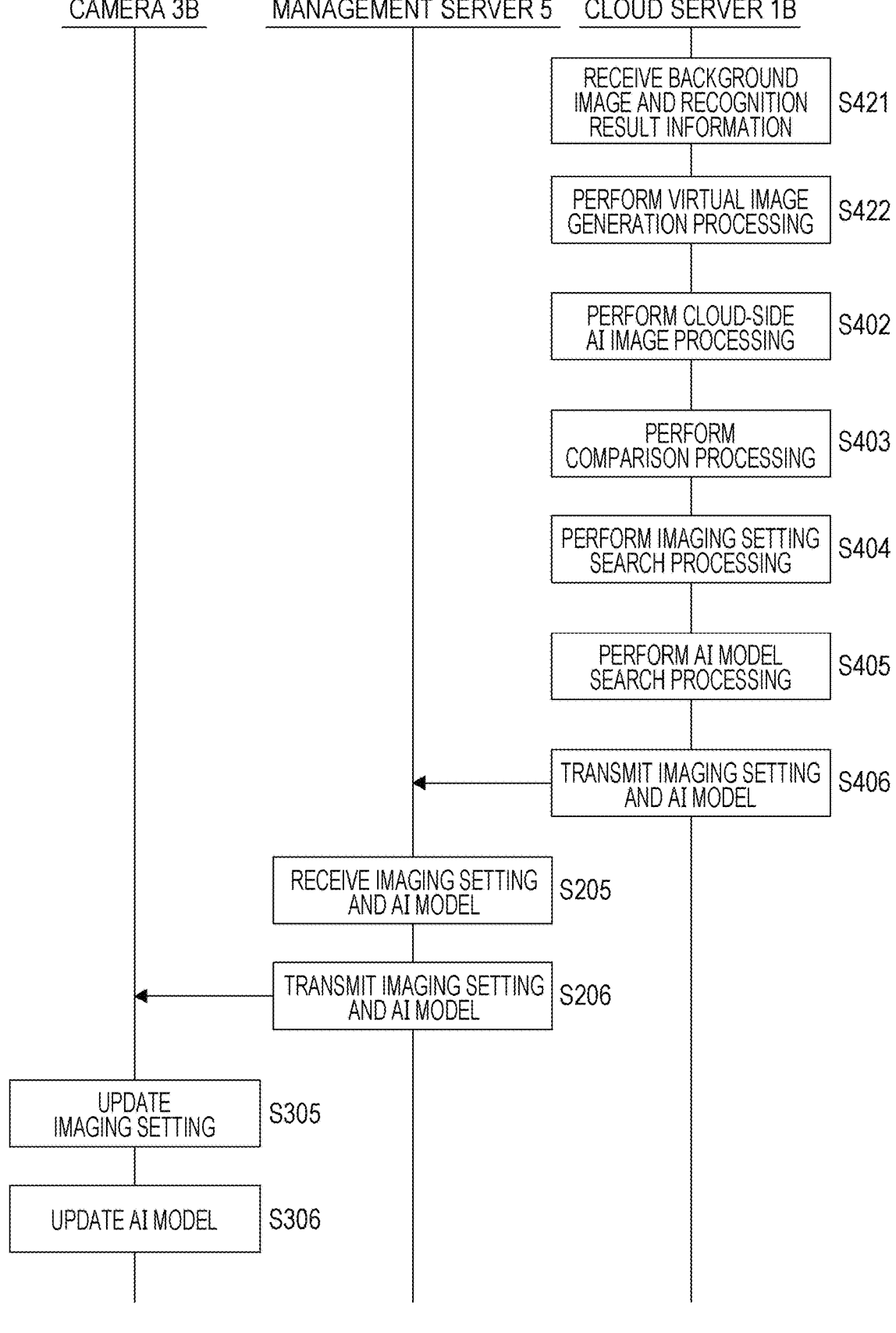
FIG. 20 is a diagram illustrating an example of the flow of processing performed by each device according to the third embodiment.

FIG. 20 illustrates processing after the camera 3B transmits the background image data and the recognition result information to the cloud server 1B.

The cloud server 1B receives the background image data and the recognition result information in step S421, and generates a virtual image in subsequent step S422. The virtual image is generated, for example, by superimposing a virtual person image on a predetermined position of the background image.

Note that, as described above, the position where the virtual person image is superimposed is received as imaging position information of a person imaged by the camera 3B and may be the same as a position where the person is imaged.

In step S402, the cloud server 1B performs cloud-side AI image processing.

The cloud-side AI image processing in the present example is processing that is performed on the generated virtual image. However, for example, in a case where there is no privacy problem such as a case where permission is obtained from a person to be imaged, it is needless to say that it can be realized by using a captured image of the person captured by the camera 3B. Furthermore, the cloud-side AI image processing is performed using a cloud-side AI model different from the edge-side AI model used for the edge-side AI image processing.

In step S403, the cloud server 1B performs processing of comparing the recognition result information. Specifically, the recognition result information received from the camera 3B is compared with the recognition result information of the cloud-side AI image processing using the cloud-side AI model, and it is determined whether or not the result obtained by the camera 3B is equivalent to the recognition result information obtained by the cloud server 1B.

In a case where the equivalent result has not been obtained, the cloud server 1B performs each processing of step S404 and the subsequent steps.

Specifically, in step S404, the cloud server 1B performs imaging setting search processing of searching for an appropriate imaging setting to be set for the camera 3B.

Next, in step S405, the cloud server 1B performs AI model search processing of searching for an edge-side AI model for obtaining a satisfactory recognition result.

In step S406, the cloud server 1B transmits, to the management server 5, the imaging setting obtained in step S403 and the edge-side AI model obtained in step S404.

In step S205, the management server 5 receives the imaging setting and the edge-side AI model from the cloud server 1B.

Next, the management server 5 stores the imaging setting and the edge-side AI model obtained through the search processing, and transmits the imaging setting and the edge-side AI model to the camera 3B in step S206.

The camera 3B receives the imaging setting and the edge-side AI model from the management server 5, and updates the imaging setting in step S305. Moreover, in step S306, the camera 3B performs processing of updating the edge-side AI model.

Note that, in the third embodiment, the example where the cloud server 1B has the image generation function F6 has been described, but the camera 3B may have the image generation function F6.

For example, the camera 3B may generate, as a virtual image, an image in which an area including personal information such as a face of a person is blacked out or removed and transmit the image to the cloud server 1B. The cloud server 1B may fill the area that has blacked out or the area from which information has been removed with a substitute image, or perform cloud-side AI image processing, imaging setting search processing, or AI model search processing using the virtual image as it is.

Alternatively, the cloud server 1B may receive the background image from the camera 3B and use the background image as it is as a captured image to realize various functions.

As described above, personal information and the like are not transmitted from the edge-side information processing device to the cloud-side information processing device, so that it is possible to protect the privacy of the subject.

Furthermore, the example where each processing of steps S201 to S206 illustrated in FIGS. 13 and 14 is performed by the management server 5 has been described, but the cloud server 1 may have the function of the management server 5 and perform each processing of steps S201 to S206. In other words, the cloud server 1 and the management server 5 may be the same information processing device.

5. Modification

In the above description, the example where a sensor that obtains a sensing image such as a normal RGB image, that is, an image indicating the light reception amount for each pixel is used as the cameras 3 and 3B has been described, but the present technology is applicable to other imaging devices. Specifically, for example, the present technology is also suitably applicable to a case where a sensor such as a time of flight (ToF) sensor that obtains a depth image as a sensing image, that is, a depth sensor that obtains a distance image indicating a distance for each pixel is used. Alternatively, the present technology is also suitably applicable to a case where a thermal sensor, that is, a sensor device that obtains a thermal image indicating a temperature for each pixel as a sensing image, or a polarization sensor, that is, a sensor device that obtains an image indicating polarization information for each pixel is used.

Furthermore, in addition to the above-described sensors, the present technology is also applicable to a multi-wavelength (multispectral) sensor, an event based vision sensor (EVS), an infrared (IR) sensor, a short wavelength infrared (SWIR) sensor, a humidity sensor, a moisture sensor, and the like.

Then, in the present technology, "imaging" is a concept including, in a broad sense, not only obtaining an image indicating the light reception amount for each pixel as a sensing image but also obtaining a depth image, a thermal image, a polarization image, a multi-wavelength image, an image representing luminance changes obtained by the EVS, an image in a predetermined wavelength band, a humidity image, a moisture distribution image, and the like as described above.

In the above description, the example where an optimum edge-side AI model is searched for in a case where the result of AI image processing by means of the edge-side AI model is different from the result of AI image processing by means of the cloud-side AI model has been described.

In addition to the above, the retraining of the AI model and the update of the edge-side AI model and the AI application loaded into each camera 3 may be triggered in response to an operation performed by the service provider or the user.

Figure 21:
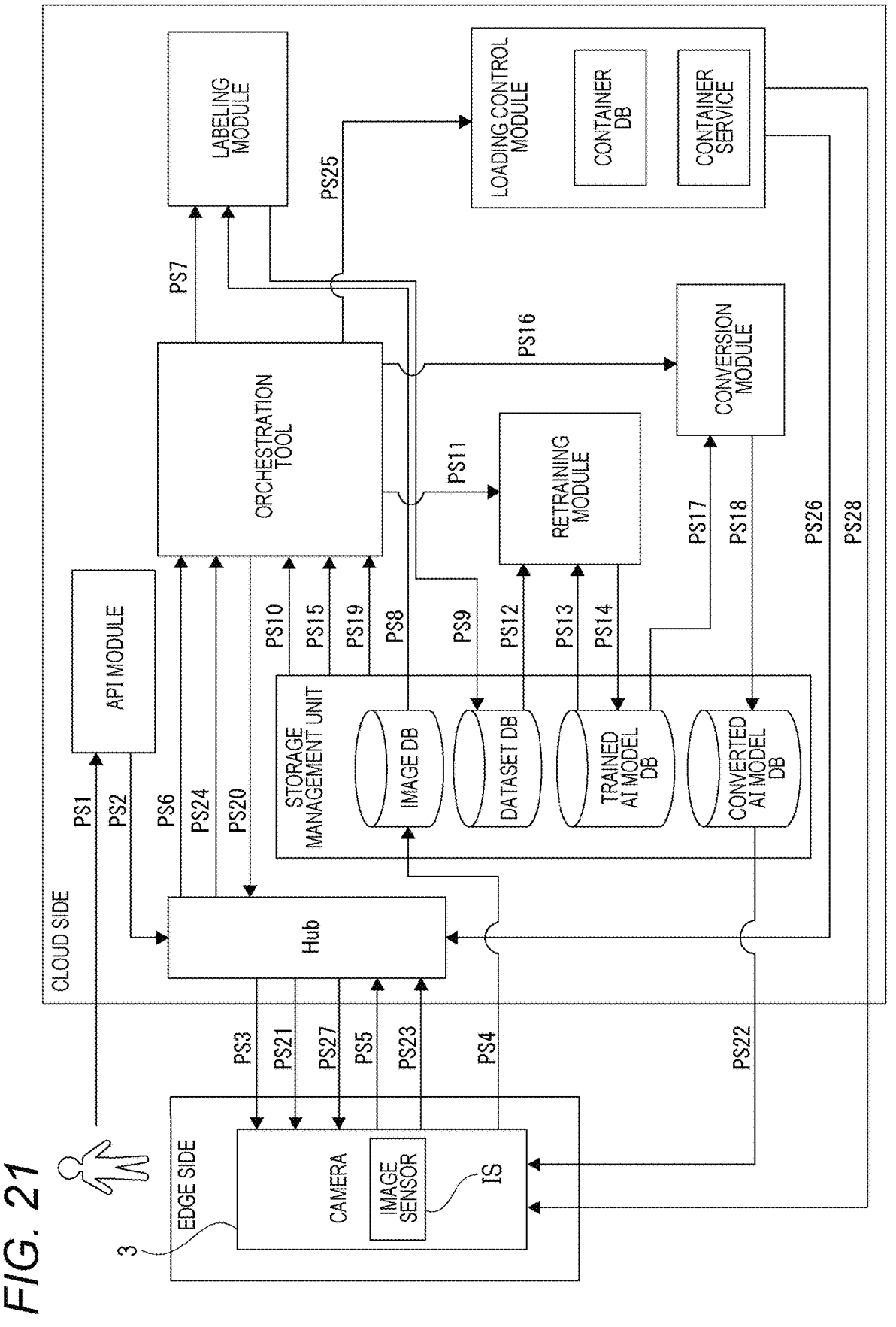
FIG. 21 is a diagram for describing a flow of processing according to a modification.

The processing flow at this time will be described in detail with reference to FIG. 21. Note that FIG. 21 is a diagram focusing on one camera 3 among the plurality of cameras 3. Furthermore, in the following description, the edge-side AI model to be updated is loaded into the image sensor IS included in the camera 3. Note that the edge-side AI model may be loaded into the camera 3 but outside of the image sensor IS.

First, in processing step PS1, the service provider or the user makes an instruction to retrain the AI model. This instruction is made using an application programming interface (API) function of an API module included in the cloud-side information processing device. Furthermore, in the instruction, an image amount (for example, the number of images) used for training is designated. Hereinafter, an image amount used for training may be referred to as "predetermined number of images".

Upon receipt of the instruction, the API module transmits a retraining request and image amount information to a Hub (similar to the Hub illustrated in FIG. 5) in processing step PS2.

In processing step PS3, the Hub transmits an update notification and the image amount information to the camera 3 serving as the edge-side information processing device.

In processing step PS4, the camera 3 transmits captured image data obtained by capturing an image to an image database (DB) of a storage group. The imaging processing and the transmission processing are performed until the number of images reaches a predetermined number of images necessary for retraining.

Note that, in a case where the camera 3 obtains an inference result of inference processing performed on the captured image data, the camera 3 may store the inference result in the image DB as metadata of the captured image data in processing step PS4.

Since the inference result in the camera 3 is stored as metadata in the image DB, it is possible to carefully select data necessary for retraining of the AI model performed on the cloud side. Specifically, the retraining can be performed using only image data that makes the inference result in the camera 3 and a result of inference performed using abundant computer resources in the cloud-side information processing device different from each other. Therefore, a time required for retraining can be shortened.

After capturing and transmitting the predetermined number of images, the camera 3 notifies the Hub that the transmission of the predetermined number of pieces of captured image data has been completed in processing step PS5.

Upon receipt of the notification, the Hub notifies the orchestration tool that preparation of retraining data has been completed in processing step PS6.

In processing step PS7, the orchestration tool transmits an instruction to perform labeling processing to a labeling module.

The labeling module acquires image data to be subjected to the labeling processing from the image DB (processing step PS8) and performs the labeling processing.

The labeling processing described herein may be processing of performing the class identification described above, processing of estimating the gender and the age of the subject appearing in the image and attaching a label, processing of estimating the pose of the subject and attaching a label, or processing of estimating the behavior of the subject and attaching a label.

The labeling processing may be performed manually or automatically. Furthermore, the labeling processing may be completed in the cloud-side information processing device or may be realized by using a service provided by another server device.

The labeling module that has completed the labeling processing stores labeling result information in the dataset DB in processing step PS9. Here, the information to be stored in the dataset DB may be a set of label information and image data or may be image identification (ID) information for specifying image data instead of the image data itself.

Upon detection that the labeling result information has been stored, a storage management unit gives a notification to the orchestration tool in processing step PS10.

Upon receipt of the notification, the orchestration tool confirms the end of the labeling processing performed on the predetermined number of pieces of image data and transmits a retraining instruction to a retraining module in processing step PS11.

Upon receipt of the retraining instruction, the retraining module acquires the dataset used for training from the dataset DB in processing step PS12 and acquires the AI model to be updated from a trained AI model DB in processing step PS13.

The retraining module retrains the AI model using the acquired dataset and AI model. The updated AI model thus obtained is stored again in the trained AI model DB in processing step PS14.

Upon detection that the updated AI model has been stored, the storage management unit gives a notification to the orchestration tool in processing step PS15.

Upon receipt of the notification, the orchestration tool transmits, to a conversion module, an instruction to convert the AI model in processing step S16.

Upon receipt of the conversion instruction, the conversion module acquires the updated AI model from the trained AI model DB in processing step PS17 and performs processing of converting the AI model.

In the conversion processing, conversion is performed in accordance with specification information or the like of the camera 3 that is a device of a loading destination. In this processing, the AI model is downsized while minimizing performance degradation, and a file format or the like of the AI model is converted so as to enable the AI model to run on the camera 3.

The AI model converted by the conversion module is the above-described edge-side AI model. This converted AI model is stored in a converted AI model DB in processing step PS18.

Upon detection that the converted AI model has been stored, the storage management unit gives a notification to the orchestration tool in processing step PS19.

Upon receipt of the notification, the orchestration tool transmits a notification for updating the AI model to the Hub in processing step PS20. This notification includes information for specifying a location where the AI model used for the update is stored.

Upon receipt of the notification, the Hub transmits, to the camera 3, an instruction to update the AI model. The update instruction also includes information for specifying the location where the AI model is stored.

The camera 3 performs processing of acquiring and loading the corresponding converted AI model from the converted AI model DB in processing step PS22. Accordingly, the AI model used in the image sensor IS of the camera 3 is updated.

Upon the end of the update of the AI model indicated by the loading of the AI model, the camera 3 transmits an update completion notification to the Hub in processing step PS23.

Upon receipt of the notification, the Hub notifies the orchestration tool that the processing of updating the AI model in the camera 3 has been completed in processing step PS24.

Note that, in a case where only the update of the AI model is performed, this is the end of processing.

In addition to the AI model, in a case where the AI application using the AI model is updated, the following processing is further performed.

Specifically, in processing step PS25, the orchestration tool transmits, to a loading control module, an instruction to download the AI application such as updated firmware.

In processing step PS26, the loading control module transmits, to the Hub, an instruction to load the AI application. This instruction includes information for specifying a location where the updated AI application is stored.

In processing step PS27, the Hub transmits the loading instruction to the camera 3.

In processing step PS28, the camera 3 downloads the updated AI application from a container DB of the loading control module and loads the updated AI application.

Note that, in the above description, the example where the update of the AI model that runs on the image sensor IS of the camera 3 and the update of the AI application that runs on the camera 3 but outside of the image sensor IS are sequentially performed has been described.

In a case where both the AI model and the AI application run on the camera 3 but outside of the image sensor IS, both the AI model and the AI application may be collectively updated as one container. In this case, the update of the AI model and the update of the AI application may be performed not sequentially but simultaneously. Then, it is possible to realize the update by performing each processing of processing steps PS25, PS26, PS27, and PS28.

Note that, even in a case where the container can be loaded into the image sensor IS of the camera 3, it is possible to update the AI model and the AI application by performing each processing of processing steps PS25, PS26, PS27, and PS28.

Performing the above-described processing causes the AI model to be retrained using captured image data captured in a use environment of the user. It is therefore possible to generate the edge-side AI model capable of outputting a highly accurate recognition result in the use environment of the user.

Furthermore, even if the use environment of the user changes such as a case where the layout in the store is changed or the location where the camera 3 is installed is changed, the AI model can be appropriately retrained each time, and it is therefore possible to maintain the accuracy of recognition made by the AI model without deteriorating.

Note that each of the above-described processing may be performed not only when the AI model is retrained but also when the system is operated for the first time under the use environment of the user.

6. Screen Example of Marketplace

An example of a screen presented to the user regarding the marketplace will be described with reference to each drawing.

Figure 22:
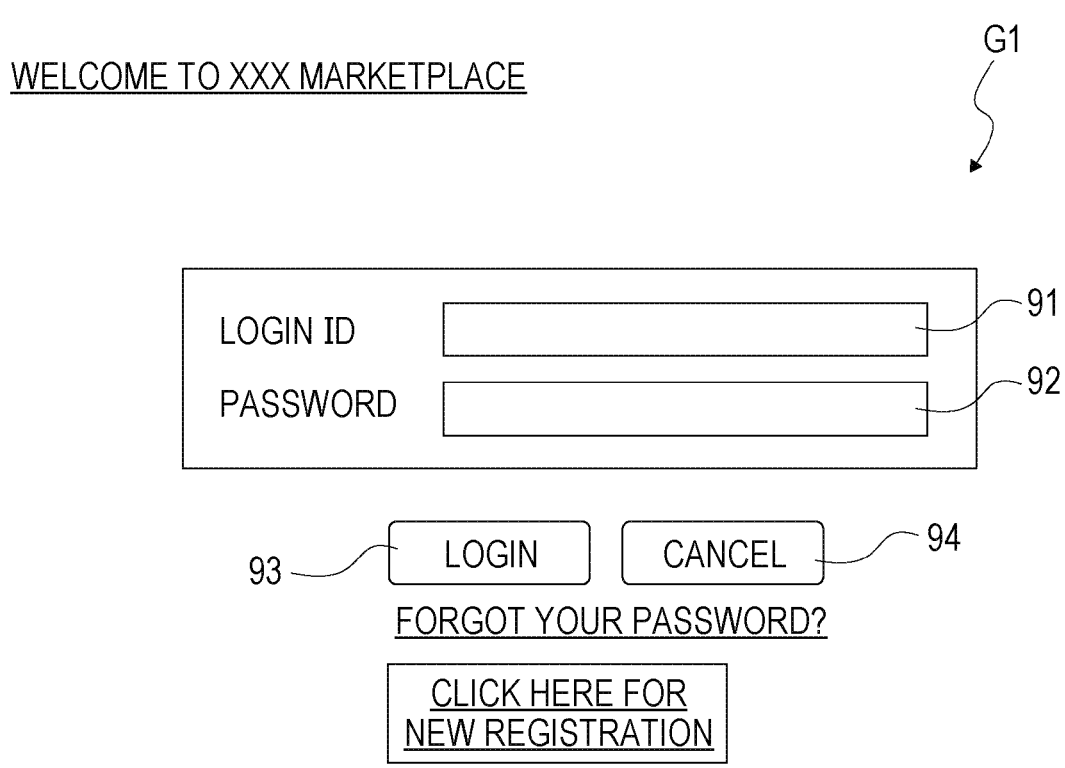
FIG. 22 is a diagram illustrating an example of a login screen for logging in to the marketplace.

FIG. 22 illustrates an example of a login screen G1.

On the login screen G1, an ID input field 91 for inputting a user ID and a password input field 92 for inputting a password are provided.

A login button 93 for performing a login and a cancel button 94 for canceling a login are arranged below the password input field 92.

Furthermore, an operation element for causing a transition to a page for a user who forgets a password, an operation element for causing a transition to a page for new user registration, and the like are arranged below the login button 93 and the cancel button 94 as needed.

When an appropriate user ID and password are input and then the login button 93 is pressed, processing of causing a transition to a user-specific page is performed in each of the cloud server 1 and the user terminal 2.

Figure 23:
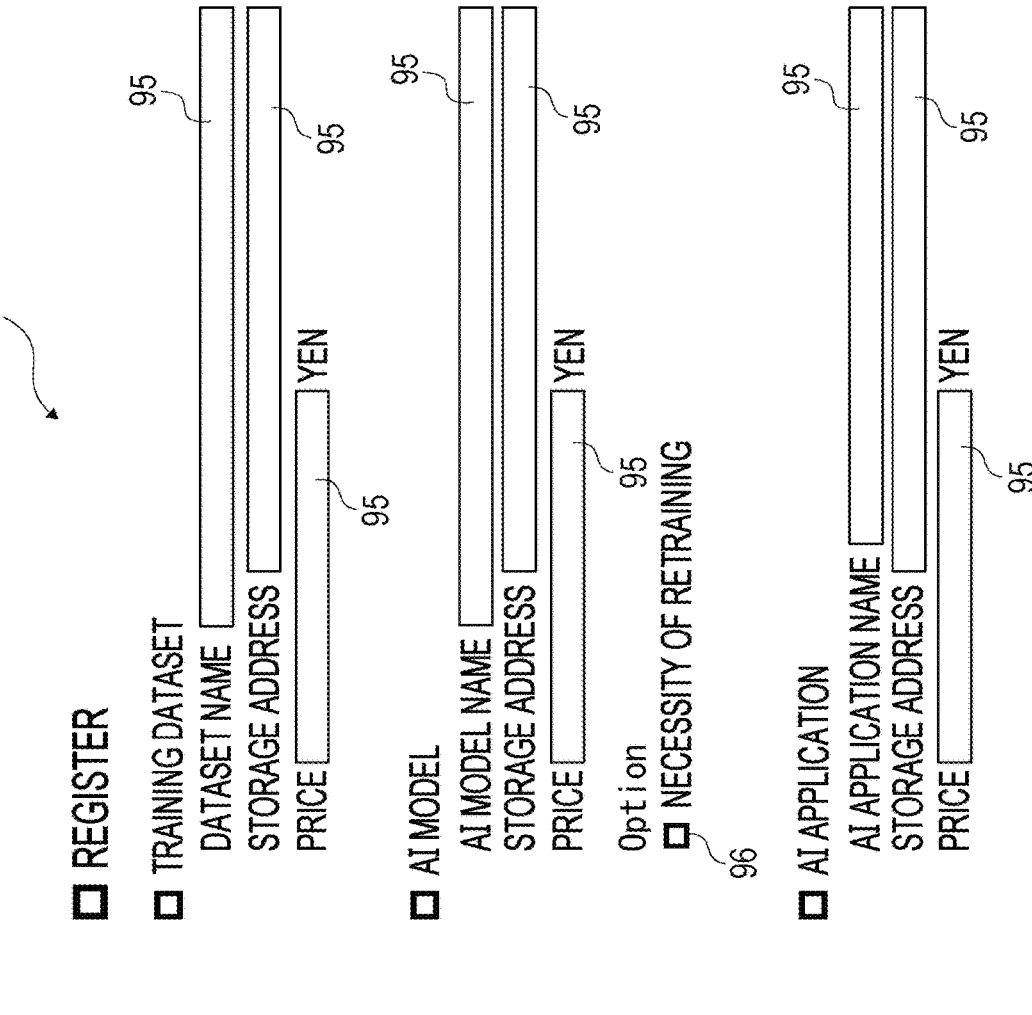
FIG. 23 is a diagram illustrating an example of a developer screen presented to each developer who uses the marketplace.

FIG. 23 illustrates an example of a screen presented to, for example, an AI application developer using the application developer terminal 2A, an AI model developer using the AI model developer terminal 2C, and the like.

Each developer can purchase, for development, a training dataset, an AI model, or an AI application through the marketplace. Furthermore, an AI application or an AI model developed by the developer him/herself can be registered in the marketplace.

On a developer screen G2 illustrated in FIG. 23, training datasets, AI models, AI applications, and the like available for purchase (hereinafter, collectively referred to as "data") are displayed on the left side.

Note that, although not illustrated in the drawing, when a training dataset is purchased, preparation for training can be made simply by displaying an image of the training dataset on a display, enclosing only a desired portion of the image in a frame using an input device such as a mouse, and inputting a name.

For example, in a case where it is desired to perform AI training using a cat image, it is possible to prepare an image to which a cat annotation is added for the AI training by enclosing only a cat portion of the image in a frame and inputting "cat" as a text input.

Furthermore, a purpose may be selectable so that desired data can be easily found. That is, display processing of displaying only data appropriate for the selected purpose is performed in each of the cloud server 1 and the user terminal 2.

Note that a purchase price of each piece of data may be displayed on the developer screen G2.

Furthermore, an input field 95 for registering a training dataset collected or generated by the developer, or an AI model or an AI application developed by the developer is provided on the right side of the developer screen G2.

The input field 95 for inputting a name and a data storage location is provided for each data. Furthermore, for the AI model, a check box 96 for setting necessity or unnecessity of retraining is provided.

Note that a price setting field (illustrated as the input field 95 in the drawing) or the like in which a price necessary for purchasing data to be registered can be set may be provided.

Furthermore, on the upper side of the developer screen G2, a username, a last login date, and the like are displayed as part of the user information. Note that, in addition to the above, the amount of currency, the number of points, and the like that can be used when the user purchases data may be displayed.

Figure 24:
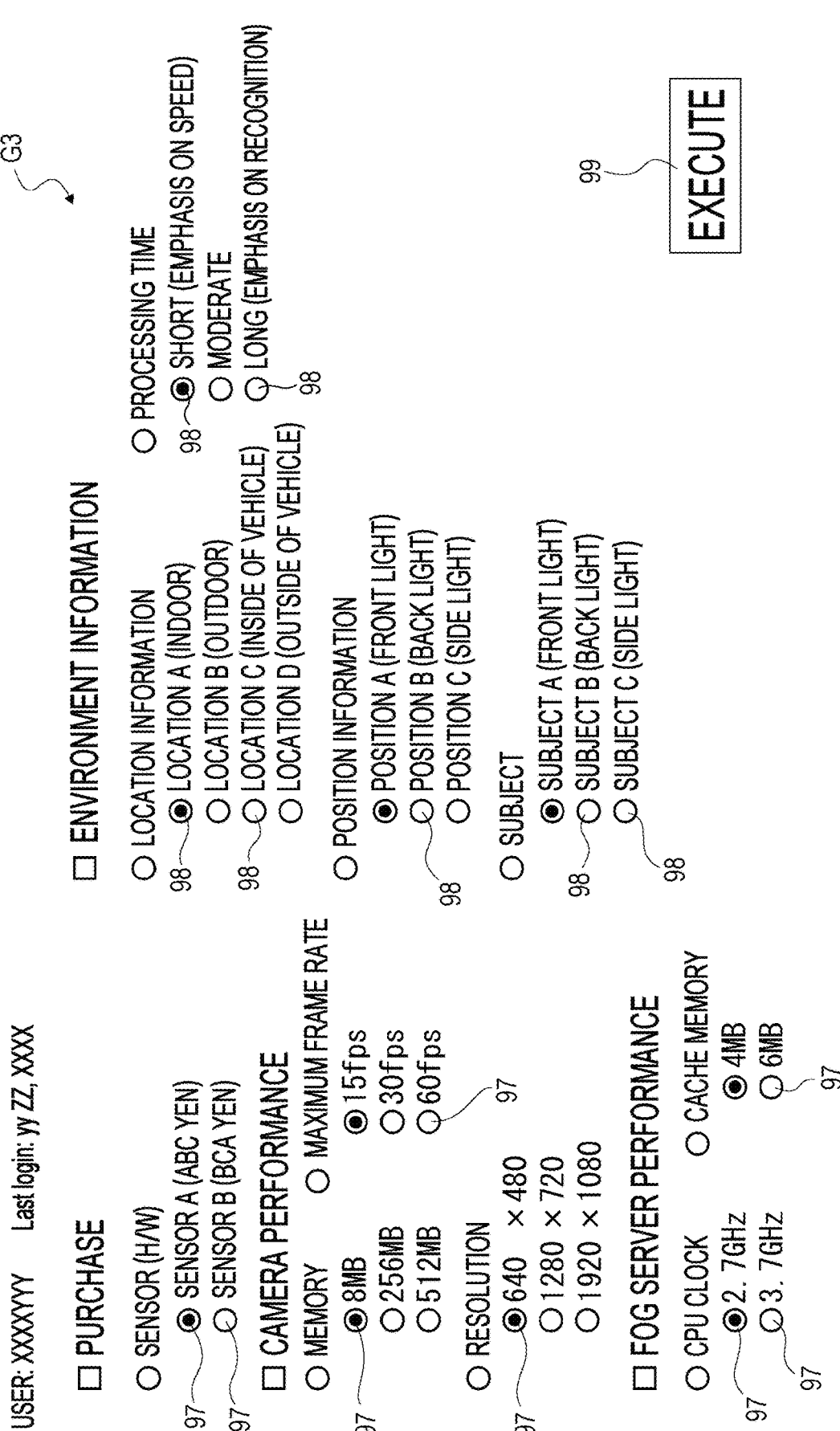
FIG. 24 is a diagram illustrating an example of a user screen presented to an application user who uses the marketplace.

For example, FIG. 24 is a diagram illustrating an example of a user screen G3 presented to the user (the above-described application user) who performs various analyses and the like by loading the AI application and the AI model into the camera 3 serving as the edge-side information processing device managed by the user.

The user can purchase the camera 3 to be arranged in a space to be monitored via the marketplace.

Accordingly, a radio button 97 with which the type or performance of the image sensor IS to be mounted on the camera 3, the performance of the camera 3, and the like can be selected is arranged on the left side of the user screen G3.

Furthermore, the user can purchase an information processing device serving as the fog server 4 via the marketplace. Accordingly, a radio button 97 for selecting each performance of the fog server 4 is arranged on the left side of the user screen G3.

Furthermore, the user who already has the fog server 4 can register the performance of the fog server 4 by inputting the performance information of the fog server 4 here.

The user realizes a desired function by installing the purchased camera 3 (alternatively, a camera 3 purchased without going through the marketplace may be used) in any desired location such as a store managed by the user, and in order to maximize the function of each camera 3, information regarding the location where the camera 3 is installed can be registered in the marketplace.

A radio button 98 with which environment information regarding the environment where the camera 3 is installed can be selected is arranged on the right side of the user screen G3. The user sets the above-described optimum imaging setting for the target camera 3 by appropriately selecting the environment information regarding the environment where the camera 3 is installed.

Note that, in a case where the camera 3 is purchased and the location where the camera 3 scheduled to be purchased is installed have been determined, it is possible to purchase the camera 3 for which an optimum imaging setting is performed in advance in accordance with the intended installation location by selecting each item on the left side and each item on the right side of the user screen G3.

The user screen G3 has an execution button 99. Pressing the execution button 99 causes a transition to a confirmation screen on which the purchase is confirmed or a confirmation screen on which the setting of the environment information is confirmed. This allows the user to purchase a desired camera 3 or a desired fog server 4 and set the environment information for the camera 3.

In the marketplace, it is possible to change the environment information of each camera 3 for when the location where the camera 3 is installed is changed. When the environment information regarding the location where the camera 3 is installed is input again on a change screen (not illustrated), it is possible to reset the imaging setting optimum for the camera 3.

7. Conclusion

As described in each of the above examples, an information processing device (cloud server 1, 1A, 1B) includes a search processing unit (imaging setting search function F4 and AI model search function F5) configured to acquire, from an imaging device (camera 3, 3B) configured to perform image processing (edge-side AI image processing) using an artificial intelligence model (edge-side AI model) on a captured image obtained by capturing an image of a subject (captured image captured by the camera 3, 3B), result information indicating a result of the image processing (for example, the above-described recognition result information), and search for imaging setting information of the imaging device and the artificial intelligence model using artificial intelligence (search AI) on the basis of the acquired result information, and an application processing unit (communication unit 80, for example) configured to apply, to the imaging device, the imaging setting information and the artificial intelligence model obtained by means of the search performed by the search processing unit.

The imaging setting information means, in a broad sense, setting information related to an imaging operation for obtaining a captured image. Specifically, the imaging setting information includes, in a broad sense, optical settings such as a focus and a diaphragm, settings related to an operation of reading a captured image signal such as a frame rate, an exposure time, and a gain, and settings related to image signal processing on the read captured image signal such as gamma correction processing, noise reduction processing, and super-resolution processing.

Furthermore, the artificial intelligence model includes, for example, an artificial intelligence model used for AI image processing. The search for an artificial intelligence model refers to, for example, processing of optimizing various processing parameters such as a weighting factor in a case where, the AI image processing includes a convolution operation, setting information (including, for example, information such as a kernel size and the like) regarding a network structure in a case where the AI image processing is performed using a neural network, and the like.

With the present configuration, in a case where the image recognition is low in reliability or accuracy, the imaging setting information of the imaging device and the artificial intelligence model used for the AI image processing are searched for. Then, an imaging setting or an artificial intelligence model that makes the image recognition higher in reliability or accuracy are obtained through the search, and set for (loaded into) the imaging device.

Therefore, since the AI image processing is performed using a newly constructed artificial intelligence model higher in reliability on the captured image captured with a more appropriate imaging setting, it is possible to recognize the subject to be detected with higher accuracy.

Furthermore, the use of the information processing device (cloud servers 1, 1A, and 1B) different from the imaging device allows the search processing to be performed using a computer device higher in processing performance than the imaging device, so that it is possible to make a processing time related to the search for the imaging setting and the artificial intelligence model shorter.

With the present configuration, the structure of the neural network is optimized by a technique called neural architecture search (NAS). Then, in the NAS by the search processing unit, the neural network, that is, the AI model is not defined as a search space, but is defined as a search space including variables and the like used for exposure control of the imaging device and various types of processing performed on the captured image signal. It is therefore possible to optimize the entire information processing system 100 including the cloud servers 1, 1A, and 1B and the cameras 3 and 3B. In other words, in order to realize an application desired by the user, it is possible to optimize not only the edge-side AI model but also various settings and processing for obtaining the captured image as a whole. It is therefore possible to obtain analysis result information optimum for the user.

As described above, the image processing unit (cloud-side AI image processing function F3) configured to perform image processing (cloud-side AI image processing) using an artificial intelligence model (cloud-side AI model) on the captured image acquired from the imaging device (camera 3, 3B) may be provided, and the search processing unit (imaging setting search function F4 and AI model search function F5) may perform a search in a case where a recognition result of the image processing (edge-side AI image processing) performed by the imaging device (camera 3, 3B) and a recognition result of the image processing (cloud-side AI image processing) performed by the image processing unit are different from each other.

For example, it is possible to evaluate the accuracy of the AI image processing performed by the imaging device by performing AI image processing using an artificial intelligence model different from the artificial intelligence model used by the imaging device and comparing the result.

It is therefore possible to appropriately determine whether or not it is necessary to improve the artificial intelligence model used for the AI image processing performed by the imaging device.

As described with the image recognition as an example with reference to FIG. 14 and the like, the artificial intelligence model (cloud-side AI model) used by the image processing unit (cloud-side AI image processing function F3) may be higher in performance than the artificial intelligence model (edge-side AI model) used for the image processing (edge-side AI image processing) performed by the imaging device (camera 3, 3B).

Accordingly, it is possible to determine the accuracy of the result information of the AI image processing performed by the imaging device on the basis of the result information obtained by using the high-performance artificial intelligence model in the cloud servers 1, 1A, and 1B.

It is therefore possible to correctly determine the accuracy of the result information of the AI image processing performed by the imaging device, and contribute to improvement in performance of the artificial intelligence model loaded into the imaging device.

Furthermore, appropriately reducing the size of the edge-side AI model loaded into the imaging device allows a reduction in power consumed by the edge-side AI image processing.

As described with the image recognition as an example with reference to FIG. 14 and the like, in the search performed by the search processing unit (AI model search function F5), an artificial intelligence model (edge-side AI model) that makes the result of the image processing (edge-side AI image processing) performed by the imaging device (camera 3, 3B) closer to the result of the image processing (cloud-side AI image processing) performed by the image processing unit (cloud-side AI image processing function F3) may be searched for.

Accordingly, it is possible to determine whether or not the result information of the AI image processing performed by the imaging device is correct on the basis of the result information of the high-performance artificial intelligence model used in the cloud servers 1, 1A, and 1B.

Then, an artificial intelligence model is newly searched for on the basis of a difference in result information, so that an artificial intelligence model that is functionally similar to the high-performance artificial intelligence model is searched for and loaded into the imaging device. It is therefore possible to perform AI image processing in the imaging device using a small and high-performance artificial intelligence model.

As described with the image recognition as an example with reference to FIG. 14 and the like, the search processing unit (imaging setting search function F4) may search for the imaging setting information on the basis of environment information when a captured image is obtained.

The environment information may include information regarding a location where the imaging device (camera 3, 3B) is installed, such as inside a store, outdoors, or inside a vehicle, or may include information indicating a positional relation between the imaging device and the sun, such as back light, front light, or side light, that is, information regarding a light source. Furthermore, the environment information may include information indicating a subject to be detected, and specifically may include the moving speed of the subject or the like.

It is possible to search for, by correctly grasping the environment information, appropriate imaging setting information in accordance with what the user desires to do, that is, with a purpose, a characteristic or a behavior of the detection target, an imaging condition, and the like taken into consideration.

The environment information may include information regarding a location where the imaging device (camera 3, 3B) is installed.

Characteristics of the captured image may vary in a manner that depends on the location where the imaging device is installed. With the present configuration, it is possible to obtain information such as the amount of light incident on the imaging device as the information regarding the location where the imaging device is installed. Furthermore, in a case where the environment information includes information regarding the orientation of the imaging device, the positional relation with the light source such as the sun can be appropriately estimated from time information, so that it is possible to estimate the amount of light incident on the imaging device or the like more appropriately.

It is therefore possible to search for appropriate imaging setting information.

Furthermore, the environment information may include information regarding light incident on the light receiving unit (imaging unit 41) of the imaging device (camera 3, 3B).

In a case where appropriate imaging setting according to the amount of light incident on the light receiving unit of the imaging device has not been made, a captured image from which it is difficult to recognize the detection target may be obtained.

With the present configuration, since the search for imaging setting information is performed on the basis of the environment information including the information regarding the light incident on the light receiving unit of the imaging device, appropriate imaging setting information or the like according to the amount of light incident on the light receiving unit is searched for. It is therefore possible to set appropriate imaging setting information for the imaging device.

As described in the first embodiment, the search for the artificial intelligence model (edge-side AI model) may be performed on the basis of the performance of the imaging device (camera 3, 3B).

Depending on the imaging device, there are a case where an artificial intelligence model large in size cannot be loaded, a case where arithmetic performance is low relative to computational complexity of the AI image processing using an artificial intelligence model, and the like.

If the search for an artificial intelligence model is performed without considering the performance of such imaging devices, there is a possibility that the performance of the edge-side AI image processing performed by the imaging device deteriorates, or the edge-side AI image processing cannot be performed in the first place. However, with the present configuration, since the search for an artificial intelligence model is performed with the performance of the imaging device taken into consideration, it is possible to search for an artificial intelligence model capable of performing the edge-side AI image processing making the maximum use of the performance of the arithmetic unit of the imaging device.

The search for an artificial intelligence model (edge-side AI model) may be performed on the basis of performance related to the image processing (edge-side AI image processing) performed by the imaging device (camera 3, 3B).

The search for the edge-side AI model is performed with the performance related to the edge-side AI image processing taken into consideration, so that an appropriate edge-side AI model is searched for and loaded into the imaging device. It is therefore possible to obtain, no manner what kind of imaging device is used as the cameras 3 and 3B, the processing result of appropriate AI image processing according to the imaging device.

As described with the image recognition as an example with reference to FIG. 13 and the like, the imaging setting information and the artificial intelligence model (edge-side AI model) obtained through the search may differ in a manner that depends on an application.

The application indicates what kind of work the user wants the imaging device (camera 3, 3B) to do, and examples the application include counting of customers who visit a store, analysis of a customer flow line, a traffic volume survey, defective product detection in a production line, and the like. Then, if the application differs, it is conceivable that the optimum artificial intelligence model (edge-side AI model) becomes different.

With the present configuration, since an artificial intelligence model that differs in a manner that depends on an application is searched for, it is possible to load an artificial intelligence model optimum for the application into the imaging device to obtain satisfactory result information.

Note that, in the first embodiment, the image recognition processing has been exemplified as the processing using AI (AI image processing), but other processing using AI (AI image processing) such as image detection processing may be used.

As described in the second embodiment, the search processing unit (processing allocation search function F2) may perform search processing for allocation of processing to be performed by each device including the imaging device (camera 3, 3B) and the information processing device (cloud server 1, 1A, 1B).

There may be a difference in performance between each device including the imaging device and the information processing device. Moreover, the image processing (cloud-side AI image processing), the comparison processing, and the analysis processing performed until the purpose of the application is achieved are different in computational complexity, amount of memory, or the like required for processing.

With the present configuration, in a case where each processing is allocated to each device, the performance of each device is taken into consideration. Therefore, since each processing can be allocated to the right device in the right place, efficiency of the processing can be improved.

Furthermore, the processing performed by each device may include analysis processing performed using the result information.

The analysis processing included in each processing to be allocated is processing in which the computational complexity, the memory usage, and the like differ in a manner that depends on the application.

Appropriately allocating such processing allows the user to efficiently obtain a desired analysis result.

Note that, in the second embodiment, the image recognition processing has been exemplified as the processing using AI (AI image processing), but other processing using AI (AI image processing) such as image detection processing may be used.

As described in the third embodiment, in the image processing (cloud-side AI image processing) performed by the image processing unit (cloud-side AI image processing function F3), a substitute image generated instead of the captured image obtained by the imaging device (camera 3, 3B) may be used.

For example, in a case where the information processing device (cloud server 1, 1A, 1B) having the present configuration provided for the imaging device is a server device, there is a possibility that it is inappropriate from the viewpoint of privacy to transmit the captured image captured by the imaging device to the server device in order to cause the server device to perform image processing (cloud-side AI image processing).

With the present configuration, since the substitute image is transmitted to the information processing device as the server device, privacy is protected.

Note that, as described above, the substitute image can be generated using a part of the captured image captured by the imaging device. It is therefore possible to appropriately perform the comparison of the result information, and an artificial intelligence model can be appropriately searched for accordingly.

As described in the third embodiment, the substitute image may be a virtual image generated on the basis of the captured image obtained by the imaging device (camera 3, 3B).

In a case where the information processing device (cloud server 1, 1A, 1B) is the server device, with the present configuration, the cloud-side AI image processing is performed using the virtual image instead of the captured image captured by the imaging device.

It is therefore possible to further protect privacy.

Note that, in the third embodiment, the image recognition processing has been exemplified as the processing using AI (AI image processing), but other processing using AI (AI image processing) such as image detection processing may be used.

As described above, the information processing device (cloud server 1, 1A, 1B) may include a selection processing unit (application configuration function) that acquires information regarding selection of an application, that is, information regarding selection of an application selected by the user using the user terminal 2, and selects the imaging setting information and the artificial intelligence model (edge-side AI model) in accordance with the selection information.

As a result, the user can load, into the imaging device (camera 3, 3B), imaging setting information and the artificial intelligence model presumed to be optimum only by selecting the application.

It is therefore possible to obtain desired analysis result information corresponding to the AI image processing without performing the processing of transmitting captured images as a training dataset from the imaging device managed by the user and the processing of retraining an artificial intelligence model using such captured images.

As described each of the above examples, the image processing (edge-side AI image processing) using the artificial intelligence model (AI model) may be image recognition processing using the artificial intelligence model.

As a result, it is possible to perform image recognition processing using AI in the camera 3 in a state where an appropriate AI application or an AI model is loaded, while using an image captured with an appropriate imaging setting. It is therefore possible for the user to obtain the optimum analysis result information regarding the image recognition processing.

An information processing method according to the present technology includes by a computer device, performing processing of acquiring, from an imaging device (camera 3, 3B) configured to perform image processing (edge-side AI image processing) using an artificial intelligence (edge-side AI model) on a captured image (captured image captured by the camera 3, 3B) obtained by capturing an image of a subject, result information indicating a result of the image processing and searching for imaging setting information of the imaging device and the artificial intelligence model using artificial intelligence (search AI) on the basis of the acquired result information, and applying, to the imaging device, the imaging setting information and the artificial intelligence model obtained by means of the search.

The program to be executed by the above-described information processing device (cloud server 1, 1A, 1B) can be recorded in advance in a hard disk drive (HDD) as a recording medium built in a device such as a computer device, a ROM in a microcomputer having a CPU, or the like. Alternatively, the program can be temporarily or permanently stored (recorded) in a removable recording medium such as a flexible disk, a compact disk read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as so-called package software.

Furthermore, such a program may be installed from the removable recording medium into a personal computer or the like, or may be downloaded from a download site over a network such as a local area network (LAN), the Internet, or the like.

Note that the effects described in the present specification are merely examples and are not limited, and other effects may be exerted.

Furthermore, the above-described examples may be combined in any way, and the above-described various functions and effects may be obtained even in a case where various combinations are used.

8. Present Technology

The present technology may also have the following configurations.

(1)

An information processing device including:

a search processing unit configured to acquire, from an imaging device configured to perform image processing using an artificial intelligence model on a captured image obtained by capturing an image of a subject, result information indicating a result of the image processing, and search for imaging setting information of the imaging device and the artificial intelligence model using artificial intelligence on the basis of the acquired result information; and an application processing unit configured to apply, to the imaging device, the imaging setting information and the artificial intelligence model obtained by means of the search performed by the search processing unit.

(2)

The information processing device according to the above (1), further including an image processing unit configured to perform image processing using an artificial intelligence model on the captured image acquired from the imaging device, in which the search processing unit performs the search in a case where a recognition result of the image processing performed by the imaging device and a recognition result of the image processing performed by the image processing unit are different from each other.

(3)

The information processing device according to the above (2), in which the artificial intelligence model used by the image processing unit is higher in performance than the artificial intelligence model used for the image processing performed by the imaging device.

(4)

The information processing device according to the above (3), in which in the search performed by the search processing unit, an artificial intelligence model that makes the result of the image processing performed by the imaging device closer to the result of the image processing performed by the image processing unit is searched for.

(5)

The information processing device according to any one of the above (1) to (4), in which the search processing unit searches for the imaging setting information on the basis of environment information when the captured image is obtained.

(6)

The information processing device according to the above (5), in which the environment information includes information regarding a location where the imaging device is installed.

(7)

The information processing device according to the above (5) or (6), in which the environment information includes information regarding light incident on a light receiving unit of the imaging device.

(8)

The information processing device according to any one of the above (1) to (7), in which the search for the artificial intelligence model is performed on the basis of performance of the imaging device.

(9)

The information processing device according to the above (8), in which the performance of the imaging device includes performance related to image processing.

(10)

The information processing device according to any one of the above (1) to (9), in which the imaging setting information and the artificial intelligence model obtained by means of the search differ in a manner that depends on an application.

(11)

The information processing device according to any one of the above (1) to (10), in which the search processing unit performs search processing regarding allocation of processing performed by each device including the imaging device and the information processing device.

(12)

The information processing device according to the above (11), in which the processing performed by each device includes analysis processing performed using the result information.

(13)

The information processing device according to the above (2), in which in the image processing performed by the image processing unit, a substitute image generated instead of the captured image obtained by the imaging device is used.

(14)

The information processing device according to the above (13), in which the substitute image includes a virtual image generated on the basis of the captured image obtained by the imaging device.

(15) The information processing device according to any one of the above (1) to (14), further including a selection processing unit configured to acquire selection information regarding selection of an application and select the imaging setting information and the artificial intelligence model in accordance with the selection information.

(16)

The information processing device according to any one of the above (1) to (15), in which the image processing using the artificial intelligence model includes image recognition processing using an artificial intelligence model.

(17)

An information processing method including by a computer device, performing processing of:

acquiring, from an imaging device configured to perform image processing using an artificial intelligence on a captured image obtained by capturing an image of a subject, result information indicating a result of the image processing, and searching for imaging setting information of the imaging device and the artificial intelligence model using artificial intelligence on the basis of the acquired result information; and applying, to the imaging device, the imaging setting information and the artificial intelligence model obtained by means of the search.

(18)

A program causing an arithmetic processing device to perform a function of:

acquiring, from an imaging device configured to perform image processing using an artificial intelligence on a captured image obtained by capturing an image of a subject, result information indicating a result of the image processing, and searching for imaging setting information of the imaging device and the artificial intelligence model using artificial intelligence on the basis of the acquired result information; and applying, to the imaging device, the imaging setting information and the artificial intelligence model obtained by means of the search.

REFERENCE SIGNS LIST

1, 1A, 1B Cloud server
3, 3B Camera (imaging device)
41 Imaging unit (light receiving unit)
71 CPU (application processing unit)
80 Communication unit (application processing unit)
F1 Application configuration function (selection processing unit)
F2 Processing allocation search function (search processing unit)
F3 Cloud-side AI image processing function (image processing unit)
F4 Imaging setting search function (search processing unit)
F5 AI model search function (search processing unit)

The invention claimed is:

1. An information processing device comprising:
circuitry including a CPU that is configured to
    acquire, from an imaging device configured to perform image processing using an artificial intelligence model on a captured image obtained by capturing an image of a subject, result information indicating a result of the image processing;
    perform a search for imaging setting information of the imaging device and the artificial intelligence model using artificial intelligence based on the result information that was acquired; and
    apply, to the imaging device, the imaging setting information and the artificial intelligence model obtained by means of the search that was performed.

2. The information processing device according to claim 1, wherein
the circuitry is further configured to
    perform image processing using an artificial intelligence model on the captured image acquired from the imaging device, and
    perform the search in a case where a recognition result of the image processing performed by the imaging device and a recognition result of the image processing performed by the circuitry are different from each other.

3. The information processing device according to claim 2, wherein
the artificial intelligence model used for the image processing performed by the circuitry is higher in performance than the artificial intelligence model used for the image processing performed by the imaging device.

4. The information processing device according to claim 3, wherein
in the search performed by the circuitry, an artificial intelligence model that makes the result of the image processing performed by the imaging device closer to the result of the image processing performed by the circuitry is searched for.

5. The information processing device according to claim 2, wherein
in the image processing performed by the circuitry, a substitute image generated instead of the captured image obtained by the imaging device is used.

6. The information processing device according to claim 5, wherein
the substitute image includes a virtual image generated based on the captured image obtained by the imaging device.

7. The information processing device according to claim 1, wherein
the circuitry is further configured to perform the search for the imaging setting information based on environment information when the captured image is obtained.

8. The information processing device according to claim 7, wherein
the environment information includes information regarding a location where the imaging device is installed.

9. The information processing device according to claim 7, wherein
the environment information includes information regarding light incident on a light receiving sensor of the imaging device.

10. The information processing device according to claim 1, wherein
the search for the artificial intelligence model is performed based on performance of the imaging device.

11. The information processing device according to claim 10, wherein
the performance of the imaging device includes performance related to the image processing.

12. The information processing device according to claim 1, wherein
the imaging setting information and the artificial intelligence model obtained by means of the search differ in a manner that depends on an application.

13. The information processing device according to claim 1, wherein
the circuitry is further configured to perform search processing regarding allocation of processing performed by each device including the imaging device and the information processing device.

14. The information processing device according to claim 13, wherein
the processing performed by each device includes analysis processing performed using the result information.

15. The information processing device according to claim 1, wherein
the circuitry is further configured to acquire selection information regarding selection of an application and select the imaging setting information and the artificial intelligence model in accordance with the selection information.

16. The information processing device according to claim 1, wherein
the image processing using the artificial intelligence model includes image recognition processing using an artificial intelligence model.

17. An information processing method performed by a computer device, the method comprising:

acquiring, from an imaging device configured to perform image processing using an artificial intelligence model on a captured image obtained by capturing an image of a subject, result information indicating a result of the image processing;

searching for imaging setting information of the imaging device and the artificial intelligence model using artificial intelligence based on the result information that was acquired; and applying, to the imaging device, the imaging setting information and the artificial intelligence model obtained by means of the searching.

18. A non-transitory computer-readable medium storing a program causing an arithmetic processing device to perform functions of:

acquiring, from an imaging device configured to perform image processing using an artificial intelligence model on a captured image obtained by capturing an image of a subject, result information indicating a result of the image processing;

searching for imaging setting information of the imaging device and the artificial intelligence model using artificial intelligence based on the result information that was acquired; and applying, to the imaging device, the imaging setting information and the artificial intelligence model obtained by means of the searching.

\* \* \* \* \* 30